(12) United States Patent
Huang et al.

(10) Patent No.: US 12,322,258 B2
(45) Date of Patent: *Jun. 3, 2025

(54) SYSTEMS AND METHODS FOR AUTOMATED TELLER MACHINE-BASED COMMUNICATION

(71) Applicant: Wells Fargo Bank, N.A., San Francisco, CA (US)

(72) Inventors: Jason Huang, San Francisco, CA (US); Darren M. Goetz, Salinas, CA (US); Dennis E. Montenegro, Concord, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/624,993

(22) Filed: Apr. 2, 2024

(65) Prior Publication Data
US 2024/0249605 A1 Jul. 25, 2024

Related U.S. Application Data

(63) Continuation of application No. 17/550,391, filed on Dec. 14, 2021, now Pat. No. 11,954,985.

(51) Int. Cl.
| | |
|---|---|
| *G07F 19/00* | (2006.01) |
| *G06Q 20/10* | (2012.01) |
| *G07D 11/235* | (2019.01) |
| *G07D 11/26* | (2019.01) |
| *G07D 11/60* | (2019.01) |

(52) U.S. Cl.
CPC ....... *G07F 19/206* (2013.01); *G06Q 20/1085* (2013.01); *G07D 11/235* (2019.01); *G07D 11/26* (2019.01); *G07F 19/207* (2013.01); *G07F 19/209* (2013.01); *G07F 19/211* (2013.01); *G07D 11/60* (2019.01)

(58) Field of Classification Search
CPC ...... G07F 19/206; G07D 11/26; G07D 11/235
USPC .......................................................... 705/43
See application file for complete search history.

(56) References Cited

U.S. PATENT DOCUMENTS

| | | | |
|---|---|---|---|
| 7,620,636 | B2 | 11/2009 | Fasciano |
| 11,403,607 | B1 | 8/2022 | Fontana et al. |
| 2009/0283587 | A1 | 11/2009 | Dibello |
| 2012/0185314 | A1 | 7/2012 | Postrel |

(Continued)

OTHER PUBLICATIONS

Hemer, J., A Snapshot on Crowdfunding, Working Papers Firms and Region No. R2/2011, Fraunhofer ISI, 2011, 44 pages.

*Primary Examiner* — Allyson N Trail
(74) *Attorney, Agent, or Firm* — Foley & Lardner LLP

(57) ABSTRACT

Systems, and methods for communicating during a calamity include a processing system of a first ATM that is communicably coupled via an ATM network to a second ATM. The first ATM includes an external network connection separate from the ATM network. The processing system can modify the first ATM from a first mode to a second mode responsive to detecting an event indicative of a calamity. The processing system can receive a user input to send a message to an address. The processing system can transmit the message to the second ATM via the ATM network, to cause the second ATM to route the message to the address. The processing system can receive a response to the message via the ATM network from the second ATM. The processing system can display the response to the message on a user interface of the first ATM.

20 Claims, 11 Drawing Sheets

(56) References Cited

U.S. PATENT DOCUMENTS

| | | |
|---|---|---|
| 2012/0310761 A1 | 12/2012 | Flynn |
| 2013/0151432 A1 | 6/2013 | Kashner et al. |
| 2013/0159194 A1 | 6/2013 | Habib |
| 2013/0226688 A1 | 8/2013 | Harvilicz et al. |
| 2014/0040157 A1 | 2/2014 | Cohen et al. |
| 2014/0046719 A1 | 2/2014 | Detitta |
| 2019/0347631 A1 | 11/2019 | Mossoba et al. |
| 2020/0051678 A1 | 2/2020 | Hurt et al. |
| 2023/0154261 A1 | 5/2023 | Demattio |
| 2023/0162591 A1 | 5/2023 | Gilbert et al. |

SYSTEMS AND METHODS FOR AUTOMATED TELLER MACHINE-BASED COMMUNICATION

CROSS-REFERENCE TO RELATED APPLICATIONS

This application is a continuation of U.S. application Ser. No. 17/550,391, filed Dec. 14, 2021, the contents of which are incorporated herein by reference in its entirety.

TECHNICAL FIELD

Embodiments of the present disclosure relates to systems and methods for providing communication through an automated teller machine (ATM).

BACKGROUND

Occasionally, effects of a calamity such as a natural disaster, terrorist attack, power outage, or various other circumstances, may cause communication networks to fail. For example, excess wind and precipitation or crowded networks may hinder communication at a time when people may need it most. In addition, people may need an easy and efficient way to access emergency services or other general safety instructions, such as an evacuation map to a safe location. While some networks may be available for transmitting messages or other information during a calamity, an individual may not have access to or a way of reaching the available network through a personal device. For example, an individual using a cell phone with one particular cell service that is unavailable or incapable of sending and receiving messages may not have access to an available cell service nearby. Furthermore, an individual who does have access to the available network may not have access to electricity to reach the available network.

SUMMARY

In one aspect, this disclosure is directed to system. The system includes a processing system of a first automated teller machine (ATM). The first ATM communicably couples to a second ATM via an ATM network. The first ATM has an external network connection separate from the ATM network. The processing system can modify a setting of the first ATM from a first mode to a second mode system responsive to detecting an event indicative of a calamity. The processing system can receive a user input to send a message to an address while the first ATM is in the second mode. The processing system can transmit the message to the second ATM via the ATM network responsive to determining that the external network connection of the first ATM is disconnected. The processing system can cause the second ATM to route the message to the address. The processing system can receive a response to the message originating from a device associated with the address via the ATM network from the second ATM. The processing system can display the response to the message while the first ATM is in the second mode on a user interface of the first ATM.

In another aspect, this disclosure is directed to a method. The method includes detecting, by a processing system of a first automated teller machine (ATM), a metric indicative of a calamity. The method further includes modifying, by the processing system of responsive to detecting the metric, the first ATM from a first mode to a second mode. The method further includes receiving, by the processing system while the first ATM is in the second mode, a user input to send a message to an address. The method further includes determining, by the processing system, if an external network connection of the first ATM is disconnected. The method further includes transmitting, by the processing system, responsive to determining that the external network connection of the first ATM is disconnected, the message to a second ATM communicably coupled to the first ATM via an ATM network, to cause the second ATM to route the message to the address. The method further includes receiving, by the processing system, a response to the message, the response received via the ATM network from the second ATM and originating from a device associated with the address. The method further includes displaying, by the processing system on a user interface of the first ATM, the response to the message while the first ATM is in the second mode.

In yet another aspect, this disclosure is directed to a method. The method includes receiving, by a processing system of a first automated teller machine (ATM) via an ATM network, a message including an address from a second ATM disconnected to an external network. The method further includes determining, by the processing system, a connection status of an external network of the first ATM. The method further includes transmitting, by the processing system, the message to a device associated with the address via the external network responsive to the connection status being active. The method further includes receiving, by the processing system via the external network, a response to the message from the device associated with the address. The method further includes transmitting, by the processing system via the ATM network, the response to the message to the second ATM.

These and other features, together with the organization and manner of operation thereof, will become apparent from the following detailed description when taken in conjunction with the accompanying drawings.

DETAILED DESCRIPTION

Figure 1:
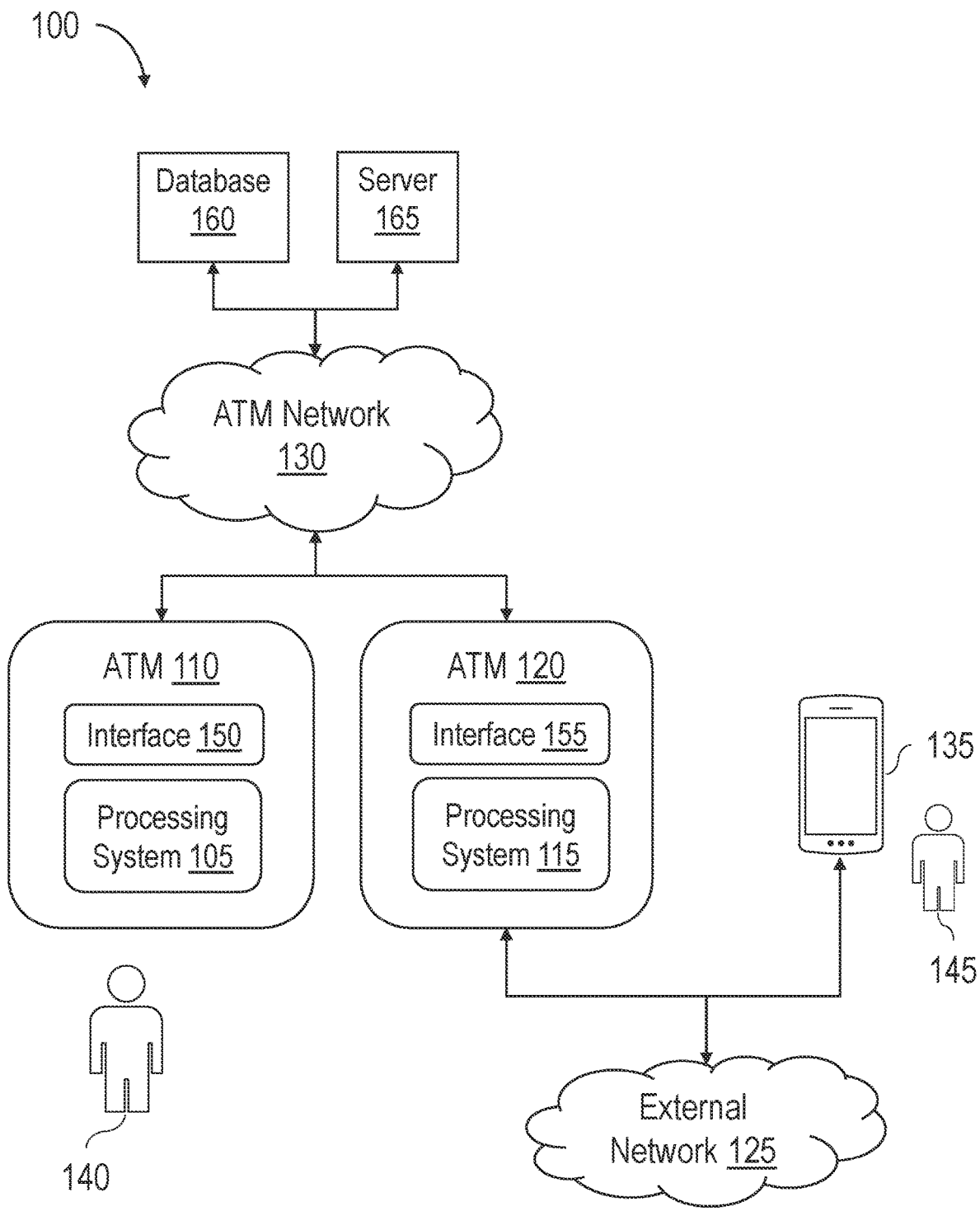
FIG. 1 shows a system for communicating during a calamity, according to an illustrative embodiment.

Referring generally to the Figures, systems, methods, and apparatuses for communicating through ATMs during a calamity are provided herein. According to the present disclosure, a first ATM is modified from a first mode to a second mode in response to detecting an event indicative of a calamity. The first ATM can receive a user input to send a message to an address, such as a user device. After determining that an external network is disconnected from the first ATM, the first ATM can transmit the message to a second ATM through an ATM network to cause the second ATM to route the message to the address. The first ATM can receive a response from the second ATM originating from the device associated from the address and can display the response on a user interface of the first ATM.

According to the present disclosure, a second ATM is modified from a first mode to a second mode in response to detecting an event indicative of a calamity. The second ATM can receive a message to route to an address, such as a user device, from a first ATM. After determining that an external network is connected to the second ATM, the second ATM can transmit the message to a user device associated with the address. The second ATM can receive a response from the device associated from the address and can transmit the response to the first ATM.

The systems and methods described herein may have many benefits over existing systems for communicating and other various operations during a calamity. For example, by providing an optimized route of communication during a calamity, the systems and methods herein may provide additional or alternative means of communication during an emergency when normal communication routes may be unavailable (e.g., downed power lines, crowded networks, etc.). Furthermore, by providing an optimized route of communication, the systems and methods herein may improve network communications by facilitating communications via different network paths based on current network conditions, such as where a normal communication route is unavailable. As another example of improvements or benefits of the systems and methods described herein, since typical ATMs do not provide quick access to currency withdrawal without eliminated or reduced transaction fees, authorization, and/or an ATM card, the systems and methods described herein may provide a quick and efficient way of accessing currency in a calamity without needing an ATM card. Additionally, the systems and methods herein may provide mass access to general safety instructions, such as evacuation routes, fire escapes, first aid instructions, or government agency-implemented instructions by displaying or otherwise providing these instructions through one or more ATMs for individuals to see and/or hear, even if an individual does not have network access on a personal device. Therefore, the systems and methods described herein may provide a more efficient way of accessing resources during a calamity, including currency, communication routes, or access to electricity. Various other technical benefits and advantages are described in greater detail below.

Referring to FIG. 1, a block diagram of a system 100 is shown according to an example embodiment. As described herein, the system 100 provides a means for communicating and completing various other tasks through one or more ATMs during a calamity. As used herein, a "calamity" is any event that causes interference, damage, or other obstructions with one or more means of communication including, but not limited to, access to networks or electricity. For example, a calamity may include a natural disaster, terrorist attack, mass power outage, or other similar emergency situations. The system 100 may include a plurality of automated teller machines (ATMs). For example, the system 100 may include a first ATM 110 and a second ATM 120. In some embodiments, the system 100 may include more or less ATMs. The first ATM 110 may include a first processing system 105. For example, the first processing system 105 may include one or more processors that may be implemented as a general-purpose processor, an application specific integrated circuit (ASIC), one or more field programmable gate arrays (FPGAs), a digital signal processor (DSP), a group of processing components, or other suitable electronic processing components structured to control the operation of the first ATM 110. The first processing system 105 may include memory (e.g., RAM, ROM, NVRAM, Flash Memory, hard disk storage, etc.) that may store data and/or computer code for facilitating at least some of the various processes described herein. The second ATM 120 may include a second processing system 115. For example, the second processing system 115 may include one or more processors that may be implemented as a general-purpose processor, an application specific integrated circuit (ASIC), one or more field programmable gate arrays (FPGAs), a digital signal processor (DSP), a group of processing components, or other suitable electronic processing components structured to control the operation of the second ATM 120. The second processing system 115 may include memory (e.g., RAM, ROM, NVRAM, Flash Memory, hard disk storage, etc.) that may store data and/or computer code for facilitating at least some of the various processes described herein.

Still referring to FIG. 1, the components of the system 100 may communicably and/or operatively couple to each other over at least one external network 125. The external network 125 may be any type of type of network. For example, the external network 125 may include a wireless network interface including various telephone lines LAN or WAN links (e.g., 802.11X, T1, T3, Gigabit Ethernet, Infiniband, ZigBee, Bluetooth, Internet, Satellite, etc.), a wired network interface (e.g., Ethernet, USB, Thunderbolt, etc.), or any combination thereof. Each of the plurality of ATMs may communicably and operably couple to at least one ATM network 130. For example, the ATM network 130 may include any ATM provider network shared by each of the plurality of ATMs including a wireless network interface (e.g., 802.11X, ZigBee, Bluetooth, Internet, etc.), a wired network interface (e.g., Ethernet, USB, Thunderbolt, etc.), or any combination thereof. The first ATM 110 and the second ATM 120 may communicably and operably couple to at least one database 160 and server 165 through the ATM network 130. The first ATM 110 and/or the second ATM 120 may be configured to store relevant data in the database 160 and/or the memory of each respective processing system. The database 160 may be configured to retrievably store data associated with each of the first ATM 110 and/or the second ATM 120 and/or any other component of the system 100. That is, the data may include information associated with each of the components of the system 100. For example, the data may include information about one or more users of the first ATM 110 and/or the second ATM 120, as described in greater detail below.

Still referring to FIG. 1, at least one of the plurality of ATMs may communicably and/or operably couple to at least one client device 135. For example, the second ATM 120 may communicably and/or operably couple to the user device 135 through the external network 125. In some embodiments, the second ATM 120 may communicably couple to the user device 135 through various means including, but not limited to, Ethernet, USB, or other similar cables. In some embodiments, the system 100 can facilitate communication between one or more users during a calamity. For example, the first processing system 105 may be configured to modify a setting of the first ATM 110 from a first mode to a second mode. In the first mode (e.g., under normal operating conditions without a calamity), each ATM may operate normally. In the second mode (e.g., during a calamity), the ATMs may include one or more additional and/or alternative operations.

The first processing system 105 (and/or the second processing system 115) may be configured to identify, determine, or otherwise detect an event indicative of a calamity, as described in greater detail below. In some embodiments, the first processing system 105 may be configured to detect the event based on sensor data from one or more sensors on the ATM 110. In some embodiments, the first processing system 105 may be configured to detect the event based on a communication received from the server 165 or from another device within the system 100. In some embodiments, the first processor system 102 may be configured to detect the event based on an input received at the ATM 110. Following detecting the event indicative of a calamity, the first processing system 105 may be configured to update, switch, or otherwise modify at least one setting of the first ATM 110. For example, the first processing system 105 may be configured to modify a currency (e.g., cash) withdraw limit setting, an authorization credential setting, and so forth.

In some examples, the first processing system 105 may be configured to detect a threshold level corresponding to an event indicative of a calamity via at least one sensor communicably and/or operably coupled to the first ATM 110 including, but not limited to, an onboard sensor such as a motion sensor, a temperature sensor, a sound detection sensor, an accelerometer, a gyroscopic sensor, barometric sensor, and/or a seismogram. For example, the one or more sensors may be configured to detect a change in weather and/or one or more sounds indicative of a calamity (e.g., sirens, alarms, screams, wind, precipitation, fire, movement, humidity, etc.). In some examples, each sensor may be configured individually with threshold limits or filters to differentiate between a normal event and an event indicative of a calamity (e.g., street construction vs. an earthquake). For example, a temperature sensor may have a threshold limit of over 120° F. to distinguish between abnormally hot days and a fire. As another example, a seismogram may have a threshold limit of +/−5 mm displacement at a time to distinguish between local disturbances or noise and an earthquake. As yet another example, a fluid gauge may have a threshold limit of over 50 mm of fluid to distinguish between typical rainfall and a flash flood. As still yet another example, a sound sensor may have a threshold limit of over 110 dB to distinguish between typical street sounds and sirens, alarms, and/or screams. The first processing system 105 may be configured to modify, change, or switch the first ATM 110 from a normal operating mode to a calamity operating mode based on the threshold limit detected by the one or more sensors, the first ATM 110 from a normal operating mode to a calamity operating mode.

In some embodiments, the first processing system 105 may be configured to detect the event in response to receiving at least one signal from an external or separated source relative to the first ATM 110. For example, the first processing system 105 may be configured to receive, via the ATM network 130, a signal from an external source such as an ATM provider commend center, a government agency, or the like, indicating a calamity is occurring. In response to receiving the signal from the external source, the first processing system 105 may be configured to switch the first ATM 110 from the first mode (e.g., normal mode) to the second mode (e.g., calamity mode).

In some embodiments, the first processing system 105 may be configured to detect the event corresponding to the calamity in response to receiving a user input to the first ATM 110. For example, an authorized user can cause the first processing system 105 to modify the settings of the first ATM 110 from the first mode to the second mode. In some examples, the first processing system 105 may be configured to authorize the user prior to the user modifying the setting of the first ATM 110. For example, the first processing system 105 may be configured to receive, via the interface 150 of the first ATM 110, identification and/or biometric data of the authorized user including, but not limited to, a facial image, a unique code or password, fingerprint data, an identification card or image, or the like such that the first processing system 105 may authorize the user's access to modify the setting of the first ATM 110 or otherwise indicate the event corresponding to the calamity. In some examples, the first processing system 105 may be configured to receive an authorization from another device communicably coupled to the first processing system 105 (e.g., via the external network 125). For example, the first processing system 105 may be configured to receive a signal from a mobile application of a mobile device communicably coupled to the first processing system 105 including the identification and/or biometric data of the authorized user. In some examples, the first processing system 105 may be configured to modify the setting of the first ATM 110 in response to receiving a signal from the mobile application of the mobile device. For example, the first processing system 105 may be configured to receive a signal from the mobile application of the mobile device corresponding to a user input or other indication to switch the first ATM 110 from a first mode to a second mode.

In some embodiments, the first processing system 105 may be configured to modify at least one setting of the first ATM 110 in response to detecting an event indicative of a calamity. For example, the first processing system 105 may be configured to modify one or more settings of the first ATM 110 including, but not limited to, a withdraw limit, authorization credentials, a message setting (e.g., to receive and/or transmit a message), a charge port exposed setting, a remote powering setting, additional accessibility settings, or other similar settings when the first ATM 110 is switched to calamity mode. Modifying one or more settings of the first ATM 110 as described may provide various improvements over existing ATM systems. For example, a typical ATM would not generally permit communication routes (e.g., transmitting messages) for a customer. However, in a calamity, the present solution may receive a request to transmit a message to an address and, in response to the request, determine an optimized route of communication and transmit the message to the address via the determined route, as described herein. This improves the functioning of computing devices by providing additional means of communication in the event of disconnected networks. Additionally, an ATM would not typically permit any physical ports to be exposed to a customer, as that could compromise the integrity of the ATM. However, in a calamity, the present solution provides a customer access to internal charging ports and/or various power generating components to provide electricity to various customer devices. This improves the functioning of computing devices by providing additional power sources in the event of downed power lines, power outages, or other similar circumstances. Furthermore, a typical ATM would not provide a remote powering setting, as that may expose the ATM to various risks. However, in a calamity, the present solution provides a customer with access to remotely charge or provide power to the ATM, which improves the functioning of computing devices by providing the customer with access to electrically power the ATM.

Still referring to FIG. 1, the first processing system 105 may be configured to receive a user input. For example, the first processing system 105 may be configured to receive a user input to the first ATM 110 when the first ATM 110 is operating in the calamity mode. The first processing system 105 may be configured to receive a user input corresponding to an indication to send a message to an address. For example, the first ATM 110 may receive a user input from a first user 140 to send a message to a second user 145 separate from the first ATM 110. In some examples, the user input may include an input to a user interface 150 of the first ATM 110. For example, the user interface 150 may include a display such as a graphical user interface for a user to input a message. In some examples, the user interface 150 may include a touch screen to receive the user input (e.g., a touch screen keyboard, number pad, etc.). In some examples, the user interface 150 may include a manual keyboard, number pad, or the like to receive the user input. By way of non-limiting example, the first user 140 may wish to send asynchronous messages including texts, numbers, symbols, or the like to a device of the second user 145 to indicate that the first user 140 is safe (e.g., a message such as "Hi Mom, I am safe. Are you OK?") The first ATM 110 may be configured to receive the message as a user input to the first ATM 110. The first ATM 110 may be configured to receive the address as a user input to the first ATM 110. For example, the first ATM 110 may be configured to receive an address corresponding to a user device 135 associated with the second user 145 such as an email address, phone number, a username for a messaging application, or the like.

The first processing system 105 may be configured to determine an optimal route of communication to transmit the message from the first ATM 110 to the user device 135. For example, the first processing system 105 may be configured to determine if the first ATM 110 is communicably coupled to the external network 125. In some instances, the first processing system 105 may determine that the first ATM 110 is connected to (e.g., communicably coupled to, active connection status, etc.) the external network 125. For example, the first processing system 105 may be configured to determine that the first ATM 110 is connected to the external network responsive to transmitting a test signal or packet via the external network 125 to a test address, to a dedicated device or server, etc., and receiving an acknowledgement of the test signal or packet. Responsive to determining that the first ATM 110 is connected to the external network 125, the first processing system 105 may be configured to transmit the message to the address via the external network 125. In some embodiments, the first processing system 105 may determine that the external network 125 connection (e.g., connection status) of the first ATM 110 is disconnected (e.g., inhibited, interrupted, etc.).

Continuing the above example, the first processing system 105 may be configured to determine that the first ATM 110 is disconnected to the external network responsive to transmitting a test signal or packet via the external network 125 to a test address, to a dedicated device or server, etc., and not receiving an acknowledgement of the test signal or packet. Responsive to determining that the first ATM 110 is disconnected from the external network 125, the first processing system 105 may be configured to transmit the message to the second ATM 120 via an available network, such as the ATM network 130, to cause the second ATM 120 to route the message to the address provided by the user input. For example, ATM networks 130 tend to have dedicated communication channels that may be more persistent than other networks (e.g., may not be affected by the calamity, by overcrowded networks, etc.) Additionally, by leveraging the ATM network 130, the first processing system 105 may have access to a plurality of networks (e.g., as opposed to one single network with typical computing systems) in which the first processing system 105 may be configured to transmit the message. This present solution increases the likelihood that one of the plurality of networks will have active connection (e.g., by transmitting a test signal or packet via the external network 125 to a test address, to a dedicated device or server, etc., and receiving an acknowledgement of the test signal or packet) to transmit the message. This improves the functioning of computing devices by providing additional routes of communication in the event of downed power lines, power outages, network error, or other similar circumstances.

The second processing system 115 may be configured to receive the message transmitted from the first processing system 105 in various ways. For example, as described in greater detail below, the first processing system 105 may be configured to initialize a connection with the second processing system 115 via a secured "handshake" and the first processing system 105 may be configured to transmit the message, and a unique identifier associated with the message and/or the first ATM 110, to the second ATM 120 via the ATM network 130. The second processing system 115 may be configured to store the message and/or the unique identifier (e.g., codes, cookies, a device ID, etc.) associated with the message from metadata locally at the second ATM 120 (e.g., on memory or a database of the second ATM 120) in association with the unique identifier of the first ATM 110 and/or the message. For example, the second processing system 115 may be configured to store a chain or ledger which identifies each of the devices (e.g., the first ATM 110 and the second ATM 120) which have received the message in association with a unique identifier of the message or message chain/thread. The second processing system 115 may use the chain or ledger to identify subsequent messages received on the message chain or thread and route the subsequent messages to a particular destination (e.g., to the first ATM 110 in this example).

In response to receiving the message from the first processing system 105, the second processing system 115 may be configured to transmit the message to the user device 135 associated with the address. For example, the second processing system 115 may be configured determine if the second ATM 120 is connected to (e.g., communicably coupled to, able to communicably couple to) the external network 125 (as described above in a manner similar to the first processing system 105). If the second processing system 115 determines that the second ATM 120 is communicably coupled to the external network 125, the second processing system 115 may be configured to transmit the message to the user device 135 through the external network 125. For example, the second processing system 115 may be configured to transmit the message and a unique identifier associated with the first ATM 110 (e.g., such as one or more codes, cookies, or data packets, a message thread or chain ID, etc.) to the user device 135. If the second processing system 115 determines that the second ATM 120 is not connected to the external network 125 (e.g., not communicably coupled to, unable to communicably couple to), the second processing system 115 may be configured to detect another route for transmitting the message including through a third ATM, as described below, or through a second external network.

In some embodiments, the second processing system 115 may be configured to receive a response to the message from the user device 135 associated with the address. For example, the second user 145 may wish to respond to the message from the first user 140. In some examples, the second user 145 may respond to the message by transmitting a message from the user device 135 to the second ATM 120 through the external network 125 (e.g., to an address corresponding to the second ATM 120 that was used by the second ATM 120 for transmitting the message to the user device 135). For example, the user device 135 may be configured to transmit the response on a same thread or channel as the message from the second ATM 120 and including the unique identifier. The second processing system 115 may be configured to perform a lookup in memory using the unique identifier (e.g., parse the memory or database of the second ATM 120). The second processing system 115 may be configured to identify the first ATM 110 based on the stored unique identifier and transmit the response to the message to the first ATM 110. For example, the second processing system 115 may be configured to transmit the response to the first ATM 110 cause the first ATM 110 to render the response.

In some embodiments, the second processing system 115 may be configured to transmit the response to the first ATM 110 through the ATM network 130. The first processing system 105 may be configured to receive the transmitted response through the ATM network 130. In some embodiments, the first processing system 105 may be configured to receive the response directly from the device 135 associated with the address. For example, the first processing system 105 may be configured to receive the response directly from the device 135 through the external network 125 (e.g., when the first processing system 105 detects that the first ATM 110 is communicably coupled to or able to communicably couple to the external network 125 as described above).

In some embodiments, the first processing system 105 may be configured to display the response to the message to the first user 140. The first processing system 105 may be configured to display the response through the user interface 150 of the first ATM 110. By way of non-limiting example, if the response to the message is "Hi, I am OK," the first processing system 105 may be configured to display "Hi, I am OK" through a display (e.g., screen) of the user interface 150. In some embodiments, the first processing system 105 may be configured to display the response to the first user 140 through one or more external devices (e.g., separate from the first ATM 110) communicably coupled to the first processing system 105, as described in greater detail below. For example, as described in greater detail below in reference to FIG. 2, the first processing system 105 may be configured to transmit the response to a mobile device of the user 140 to cause the mobile device to render the response.

Figure 2:
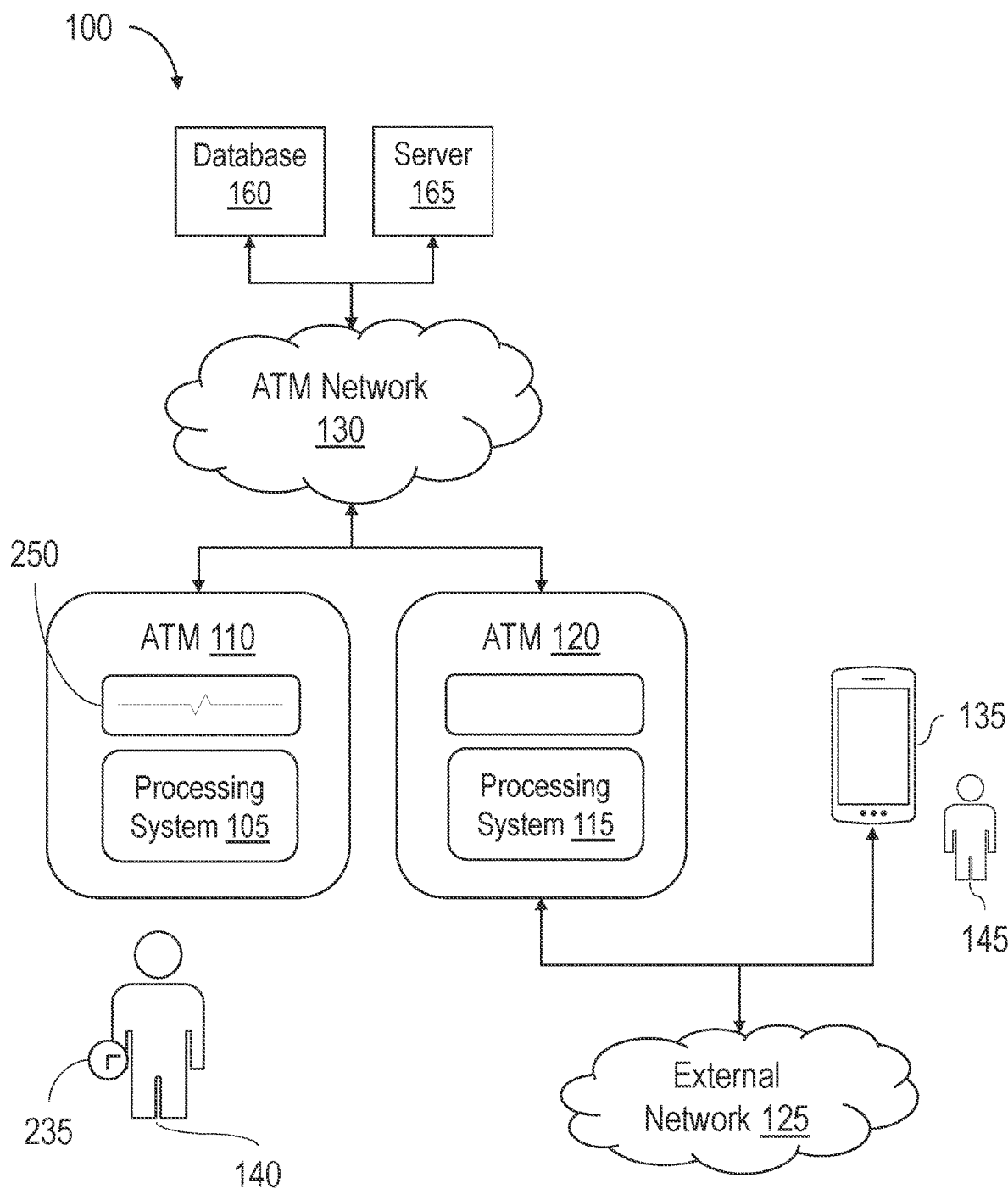
FIG. 2 shows a system for communicating during a calamity, according to an illustrative embodiment.

In some embodiments, the first processing system 105 may be configured to determine an operating status based on a physical metric of the first ATM 110. For example, the first processing system 105 may be configured to determine an operating status of various components of the first ATM 110, such as the user interface 150 of the first ATM 110. Referring now to FIG. 2, a block diagram of a system 100 is shown according to an example embodiment. As shown in FIG. 2, the first processing system 105 may be configured to determine that a component of the first ATM 110 is damaged (e.g., cracked, broken, inoperable, etc.). In some instances, the calamity may cause damage to the user interface 150 of the first ATM 110 (e.g., shown as inoperable user interface 250), such that the user interface 250 cannot receive a user input corresponding to a message as described above. In some instances, the calamity may cause damage to the user interface 150 of the first ATM 110 such that the user interface 250 cannot display the response to the message, as another example. In some embodiments, the first processing system 105 may be configured to run a diagnostic check of various hardware and/or software components of the first ATM 110 in response to detecting the calamity. For example, the first processing system 105 may be configured to transmit a test signal or data packet to one or more components of the first ATM 110 (e.g., via one or more processors of the first processing system 105) and not receive an acknowledgement of the test signal or packet. The first processing system 105 may be configured to determine that one or more components of the first ATM 110 are malfunctioning or damaged based on the diagnostic check. As another example, the first processing system 105 may be configured to receive an acknowledgement of the test signal or packet and determine that one or more components of the first ATM 110 are malfunctioning or damaged based on the received signal (e.g., an erratic signal, an inconsistent signal, etc.)

In some embodiments, the first processing system 105 may be configured to detect an error corresponding to a user input to a touchscreen (e.g., on the user interface 150) of the first ATM 110. For example, the first processing system 105 may be configured to receive one or more tap events (e.g., user inputs to a touchscreen). The first processing system 105 may be configured to map each tap event to a corresponding coordinate of the touchscreen. If one or more coordinates do not correspond to a predetermined on-screen button (e.g., a predetermined coordinate on the touchscreen), then the first processing system 105 may be configured to determine that the touchscreen is not functioning properly. In some embodiments, the first processing system 105 may be configured to receive one or more indications from a component of the first ATM 110 corresponding to a malfunction. For example, the first processing system 105 may be configured to receive sounds of a malfunction (e.g., sounds of a spark, pop, grinding, etc.) from a microphone of the first ATM 110. As another example, the first processing system 105 may be configured to detect utterances using Natural Language Processing (NLP) to determine that one or more components of the first ATM 110 is malfunctioning or damaged (e.g., using keywords corresponding to malfunction such as "broken," "down," or "damaged."). In some embodiments, the first ATM 110 may include various sensors and/or cameras to facilitate detecting malfunctioning or damaged components. For example, the first processing system 105 may be configured to receive one or more signals from a smoke and/or temperature sensor at a predetermined threshold (e.g., a temperature over 120° C., presence of smoke, etc.) indicating one or more components of the first ATM 110 is malfunctioning or damaged. As another example, the first processing system 105 may be configured to receive one or more signals from an internal and/or external camera of the first ATM 110 including an image or video corresponding to a damaged or malfunctioning component of the first ATM 110.

In some embodiments, the first processing system 105 may be configured to detect an external user interface separate from the first ATM 110. In some instances, the first processing system 105 may be configured to detect a second user interface 235 of a user device capable of communicably coupling to the first processing system 105 (e.g., via one or more wireless access points). For example, a mutual authentication may occur through a "handshake packet" between the first ATM 110 and a nearby user device. A handshake packet is an automated process of communicating between two devices. In some embodiments, the handshake packet may be configured to use NFC, Bluetooth™, Wi-Fi, and the like, between the first processing system 105 and the nearby user device. In some examples, the handshake packet may be configured to use Wi-Fi external to the first ATM 110 (e.g., a nearby accessible wireless network). In some examples, the handshake packet may be configured to use Wi-Fi internal to the first ATM 110 (e.g., a local wireless connection usable by the first ATM 110 and one or more local or nearby devices for short range communication). For example, the nearby user device (shown through second user interface 235 in FIG. 2) may be configured to send device capabilities and/or specification in a metadata, a header, and/or a body of the handshake packet to the first processing system 105. The first processing system 105 may be configured to receive the handshake packet from the device and identify the specifications and/or capabilities of the device. The first processing system 105 may be configured to determine that the device includes a graphical user interface (e.g., second user interface 235) which can be used to mirror, project, or otherwise render the user interface 150 of the first ATM 110. The first processing system 105 may be configured to similarly send a handshake packet back to the nearby device, which may establish a channel between the first ATM 110 and the user device. In some examples, the first processing system 105 may be configured to detect the device having the second user interface 235, such as a smart device (e.g., mobile phone, watch, headphones, etc.), from a nearby user (e.g., shown as user 140) to receive a user input (e.g., text, numbers, commands, sounds, etc.) to send the message to the address through the established channel between the first ATM 110 and the nearby device. For example, the first processing system 105 may be configured to mirror an original display of the user interface 150 of the first ATM 110 or otherwise provide an interference according to the capabilities of the second user interface 235 (e.g., audible commands via smart headphones with a microphone) through the established channel between the first ATM 110 and the nearby device.

Figure 3:
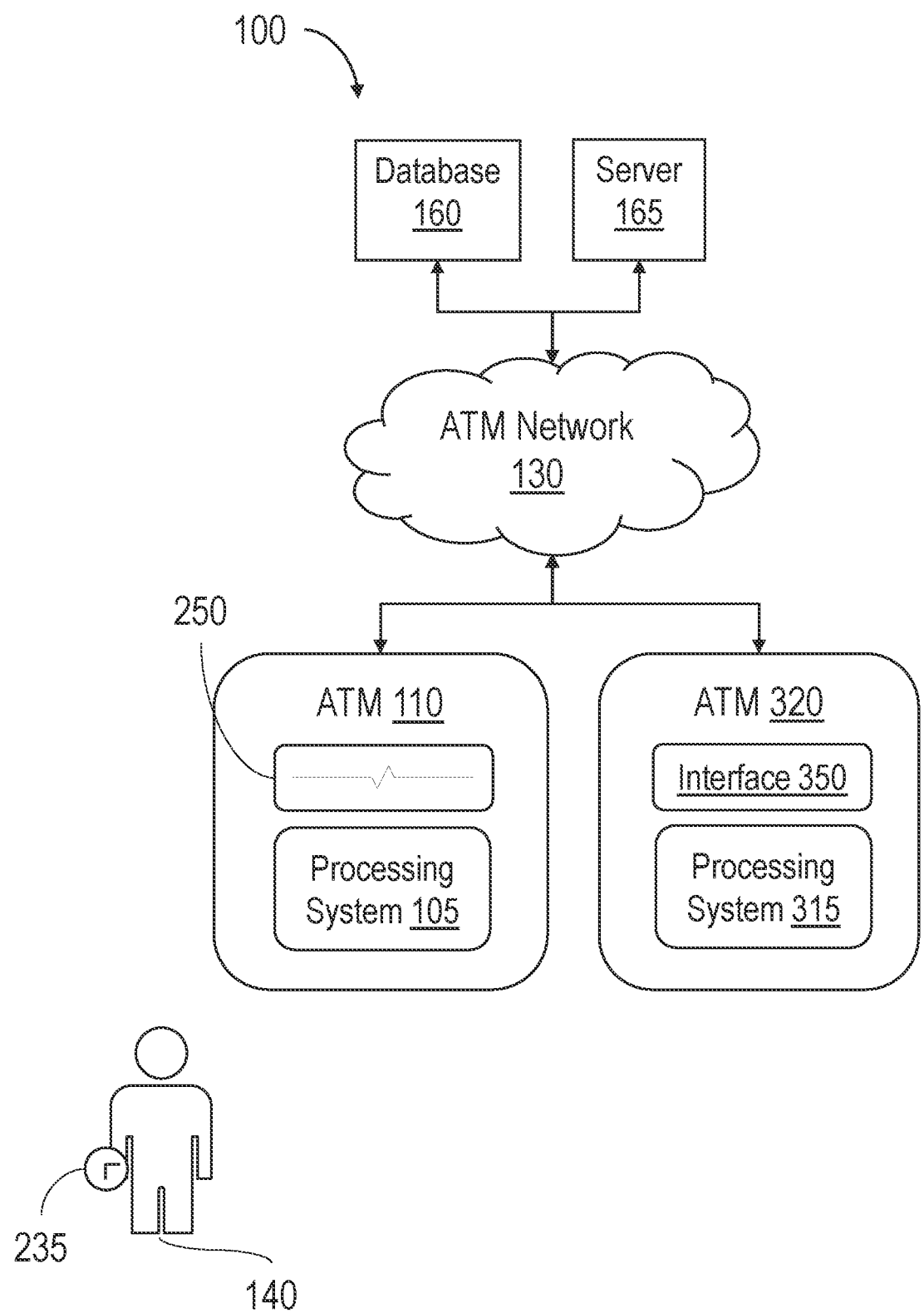
FIG. 3 shows a system for communicating during a calamity, according to an illustrative embodiment.

Referring now to FIG. 3, a block diagram of a system 100 is shown according to an example embodiment. As shown in FIG. 3, the first processing system 105 may be configured to display the user interface 250 through another ATM (e.g., a third ATM 320 located near the first ATM 110). For example, the first processing system 105 may be configured to detect a nearby (e.g., adjacent, within 25 centimeters, within 1 meter, within 10 meters, etc.) ATM that is undamaged and not currently in use by another user. The first processing system 105 may be configured to display or render, via a display of the third ATM, the user interface 250 of the first ATM 110 such that the first ATM 110 can receive a user input from the display 350 of the third ATM 320. In some examples, the first processing system 105 may be configured to receive one or more signals from the third ATM 320 (e.g., from the third processing system 315) to control or otherwise operate the first ATM 110 through the third ATM 320. In some examples, the first processing system 105 may be configured to cause the third ATM 320 to dispense currency in response to receiving a signal via the first processing system 105, as will be described in greater detail below. In some embodiments, the first processing system 105 and/or the second processing system 115 may be configured to cause the third processing system 315 to transmit and/or receive one or more messages between the first user 140 and a second user (e.g., second user 145) as described herein.

Figure 4:
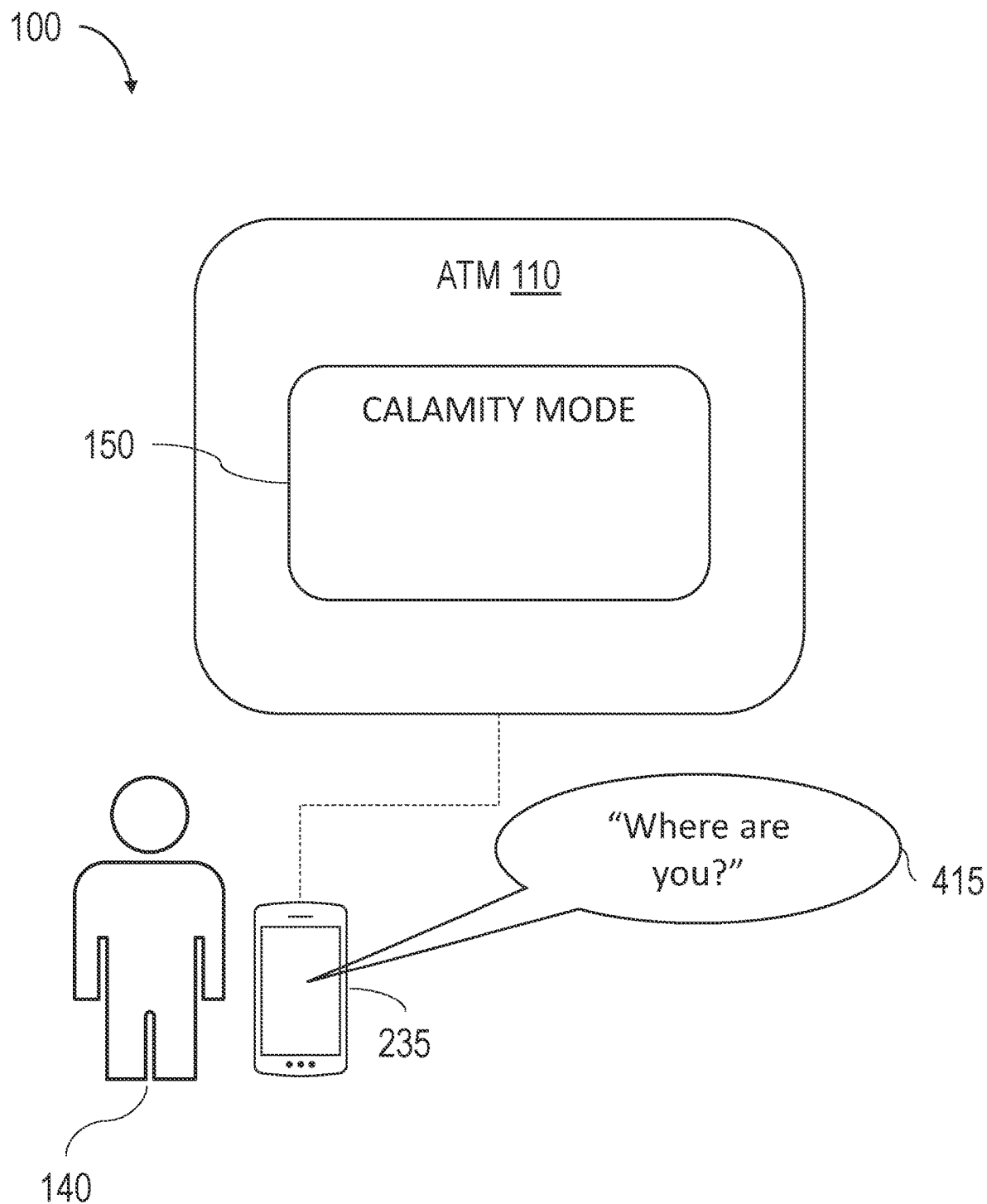
FIG. 4 shows an example of an ATM in a calamity mode, according to an illustrative embodiment.
Figure 5:
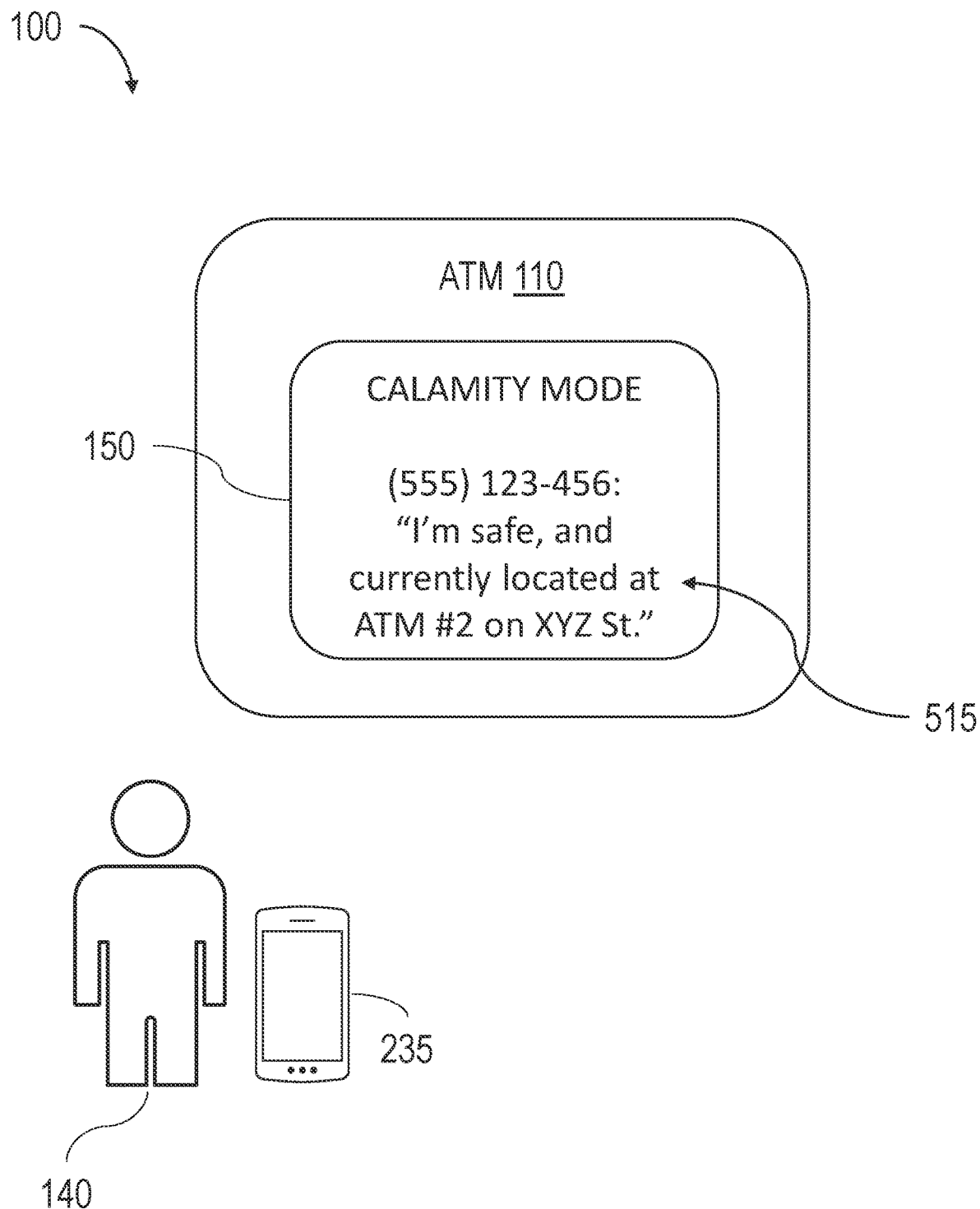
FIG. 5 shows an example of an ATM in a calamity mode, according to an illustrative embodiment.

Referring now to FIGS. 4 and 5, an example communication between a first user and a second user through the first ATM 110 is shown according to an example embodiment. For example, as shown in FIG. 4, a user 140 may input or otherwise request to send a message (shown as message 415) to an address. By way of non-limiting example, the user 140 may indicate (e.g., input via a second interface 235 such as a mobile device) to the first ATM 110 to send "Where are you?" to a specific address (e.g., email address, phone number, username, etc.). The first ATM 110 may be configured to receive the message 415 (e.g., through the first processing system 105 shown in FIGS. 1-3) and transmit the message 415 to the second ATM 120 to cause the second ATM 120 to transmit the message 415 to the user device associated with the address. Referring now to FIG. 5, an example response (shown as response 515) is displayed on the first ATM 110. By way of non-limiting example, the first processing system 105 may be configured to display "I'm safe, and currently located at ATM #2 on XYZ St." to the user 140 through the user interface 150 of the first ATM 110. While the response 515 shown in the example embodiment in FIG. 5 includes a visual response 515 (e.g., through text), the first processing system 105 may be configured to provide the response 515 to the user 140 in various way including, but not limited to, voice recordings, images, or other audio and/or visual methods.

Figure 6:
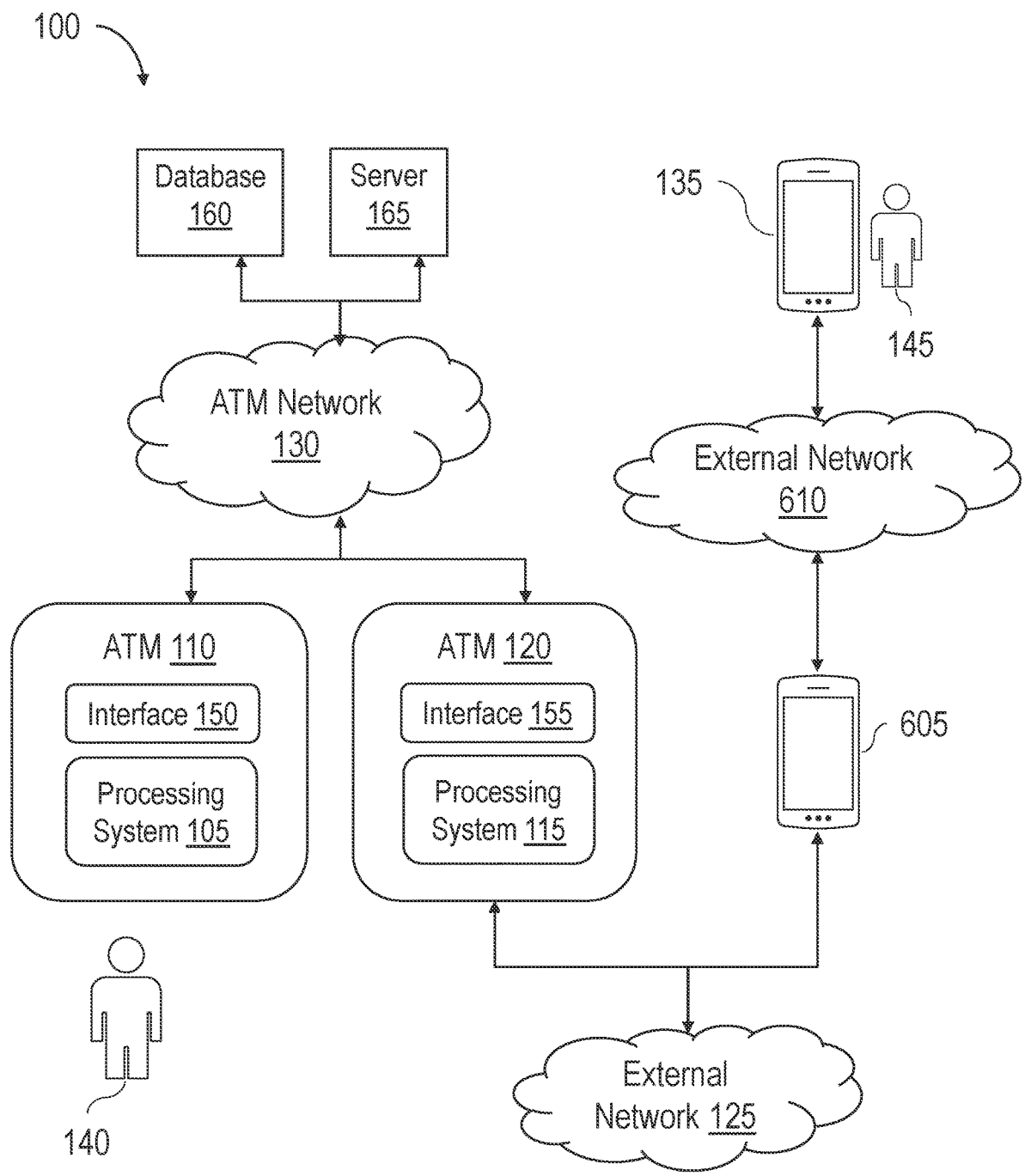
FIG. 6 shows a system for communicating during a calamity, according to an illustrative embodiment

Referring now to FIG. 6, a block diagram of a system 100 is shown according to an example embodiment. As shown in FIG. 6, the second processing system 115 may be configured to transmit the message to an intermediate user device 605 to cause the intermediate user device 605 to transmit the message to the user device 135 associated with the address. For example, the second processing system 115 may be configured to determine that the second ATM 120 is disconnected from one external network 610 (e.g., through the process described above in reference to FIG. 1), but is connected to another external network 125 (e.g., through the process described above in reference to FIG. 1). By way of non-limiting example, in one circumstance, the first processing system 105 may be configured to receive a request to send a message to an address. The first processing system 105 may be configured to determine that the first ATM 110 is disconnected from external network 610 (e.g., by the processes described herein). For example, the external network 610 may be a cellular network (e.g., LAN) of the user device 135 associated with the address. In response to determining that the first ATM 110 is disconnected from the external network 610, the first processing system 105 may be configured to transmit the message to the second processing system via the ATM network 130. The second processing system 115 may be configured to determine that the second ATM 120 is disconnected from the external network 610 (e.g., by the processes described herein). In response to determining that the second ATM 120 is disconnected from the external network 610, the second processing system 115 may be configured to determine a second network (e.g., external network 125, such as NFC). In response to determining that the second ATM 120 is connected to the external network 125 (e.g., NFC), the second processing system 115 may be configured to transmit the message to an intermediate device 605 via the external network 125 to cause the intermediate device 605 to transmit the message to the user device 135 associated with the address via the external network 610 (e.g., through a common cellular network).

As described above in reference to the first ATM 110 and the second ATM 120, each device transmitting the message (e.g., the intermediate device 605, the user device 135, etc.) may be configured to receive, store, and/or transmit a unique identifier associated with the message and/or each of the devices (e.g., the first ATM 110, the second ATM 120, the intermediate device 605, the user device 135) such that each device can transmit the message through a common channel of each network. For example, the intermediate device 605 may be configured to receive a unique identifier from the second ATM 120 and store the unique identifier through memory of the intermediate device. Further, the intermediate device 605 may be configured to transmit a unique identifier to the user device 135 to establish and maintain a channel between the first ATM 110, the second ATM 120, the intermediate user device 605, and/or the user device 135.

In some embodiments, the first processing system 105 may be configured to receive and/or provide synchronous (e.g., real-time) communication through the first ATM 110. For example, as described in greater detail below, the first processing system 105 may be configured to activate (e.g., send a signal or data packet to) a camera, microphone, or similar component of the first ATM 110 to provide a customer access to real-time communication (e.g., live-stream, video chat, audio chat, etc.) with another individual, such as a first responder. In some instances, the first processing system 105 may be configured to receive one or signals from an external source and provide one or more notifications to a user of the first ATM 110 in response to receiving the one or more signals. For example, the first processing system 105 may be configured to provide access to communication with emergency services to a user through the first ATM 110 (e.g., provide real-time audio and/or visual communication with an emergency service when the first ATM 110 is in calamity mode) though a microphone, speaker, and/or camera of the first ATM 110. In some examples, the first processing system 105 may be configured to receive and/or transmit one or more signals to emergency responders (e.g., police, firefighters, etc.), government contract centers (e.g., FBI, CIA, NSA, CDC, HHS, WHO, etc.), a computing system provider (e.g., ATM server 165), and/or various third party computing systems (e.g., Facebook Safety Check). For example, the first processing system 105 may be configured to receive and/or transmit these signals through inter-agency and/or API-based communication. In some examples, the first processing system 105 may be configured to transmit one or more signals, such as the message from the user input, to a safety database (e.g., database queried to determine individual status's of a user).

In some embodiments, the first processing system 105 may be configured to display pertinent information to a user of the first ATM 110 (e.g., through one or more of the interfaces described herein, through a speaker of the first ATM 110, etc.). For example, the first processing system 105 may be configured to display instructions corresponding to inputting a message to an address, as described above (e.g., step-by-step instructions to send a message through the first ATM 110). The first processing system 105 may be configured to display evacuation instructions. For example, the first processing system 105 may be configured to display a fire escape map, a map that highlights undamaged streets, etc.) through one or more interfaces described herein. In some examples, the first processing system 105 may be configured to provide a user of the first ATM 110 printable instructions such as an evacuation route, shelter locations, emergency phone numbers, or the like. For example, the first processing system 105 may be configured to provide the instructions on a piece of paper via a receipt printer of the first ATM 110 and/or via slips of paper that have been pre-loaded into cash cassettes of the first ATM 110. In some examples, the first processing system 105 may be configured to provide various generic instructions including, but not limited to, news updates (e.g., from a local news provider, a government agency, etc.) and/or first aid instructions (e.g., CPR instructions, tourniquet instructions, etc.). The first processing system 105 may be configured to provide the various instructions through a visual format (e.g., display of a user interface) and/or an audio format (e.g., speakers of the first ATM 110, nearby headphones of a user, etc.). In some examples, the first processing system 105 may be configured to provide the various instructions in a multilingual format.

Figure 7:
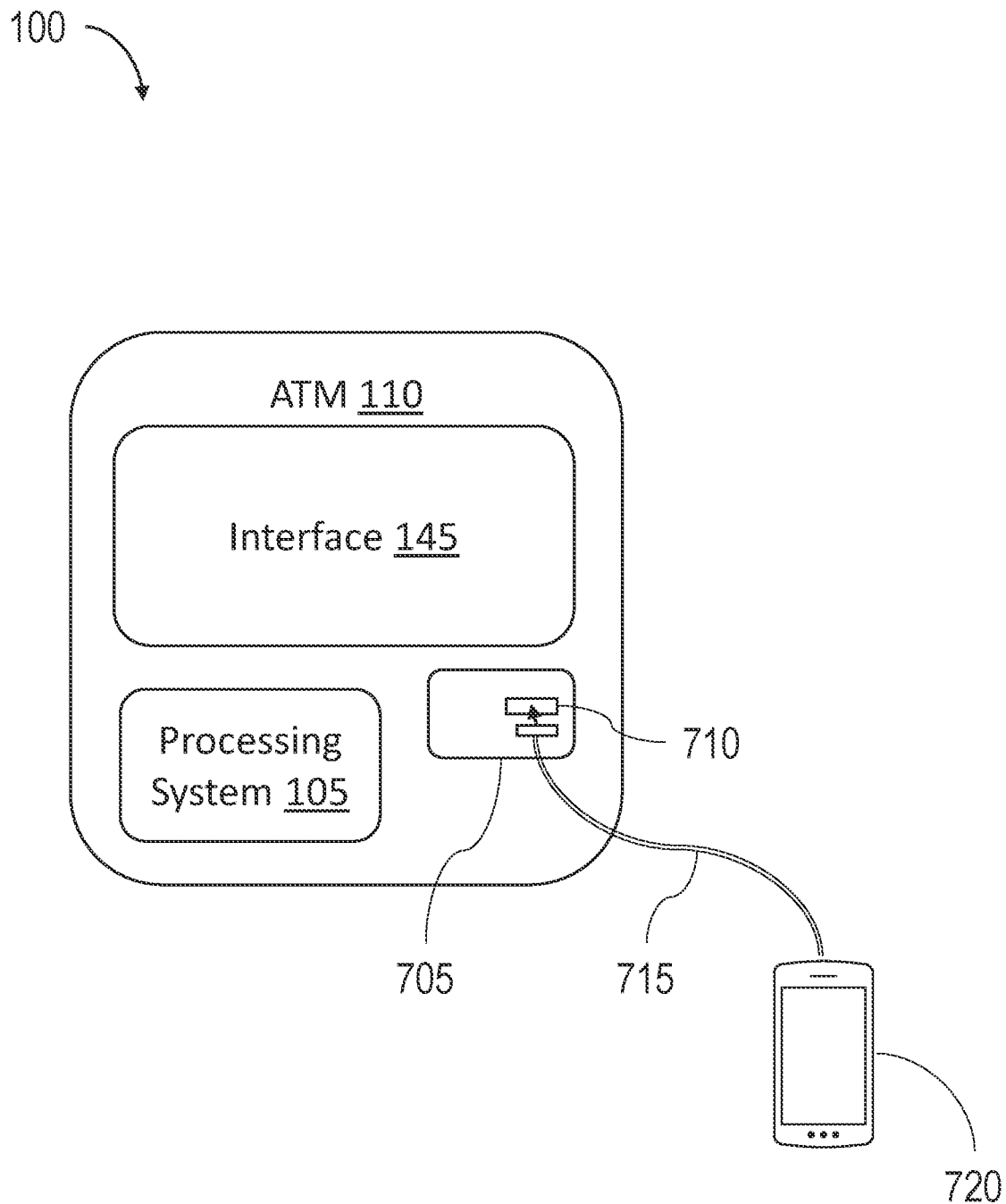
FIG. 7 shows an example of an ATM in a calamity mode, according to an illustrative embodiment.
Figure 8:
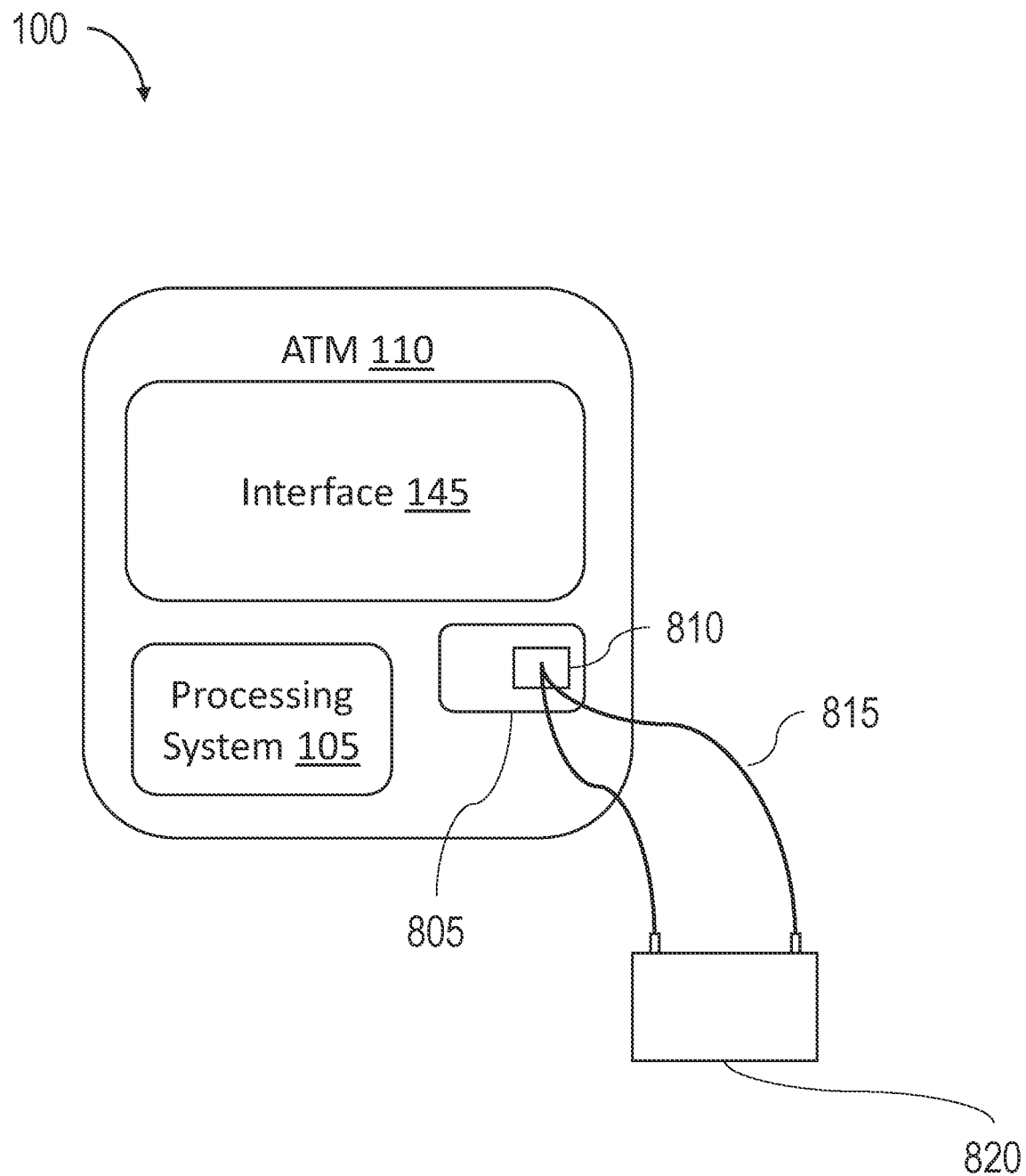
FIG. 8 shows an example of an ATM in a calamity mode, according to an illustrative embodiment.

Referring now to FIGS. 7 and 8, an example of the first ATM 110 in the calamity mode is shown according to an example embodiment. As shown in FIGS. 7 and 8, the first processing system 105 may be configured to expose one or more internal compartments of the first ATM 110 responsive to the first ATM 110 being in the second mode (e.g., calamity mode). For example, as shown in FIG. 7, the first processing system 105 may be configured to expose (e.g., open, unlatch, etc.) a first compartment 705 including at least one charging port 710 in response to the first ATM 110 being in calamity mode. The first compartment 705 may include any compartment, slot, locker, or chamber of the first ATM 110 that houses an electrical charging port 710.

In some embodiments, the first compartment 705 may not be exposed external to the first ATM 110 in the first mode. For example, in normal operating conditions, the first processing system 105 may be configured to maintain the charging port 710 internal to the first ATM 110 such that a user of the first ATM 110 cannot access the charging port 710. When the first ATM 110 changes to the second mode (e.g., calamity mode), the first processing system 105 may be configured to expose the charging port 710 (e.g., open the compartment) such that a user of the first ATM 110 can access the charging port 710. In some examples, the first compartment 705 may include one or more charge cables 715 to facilitate coupling a user device (e.g., device 720) with the charging port 710 such that the first ATM 110 can cause the device 720 to charge. The first compartment 705 may include a plurality of charge cables 715 each configured to charge a corresponding device 720. For example, the first compartment 705 may include a first charge cable 715 configured to provide charge to a mobile device. The first compartment 705 may include a second charge cable 715 to provide charge to a computer (e.g., laptop), as another example. The first compartment 705 may include a third charge cable 715 to provide charge to a smart watch device, as yet another example.

In some embodiments, the first processing system 105 may be configured to detect a device 720 coupled to the charging port 710 through the charge cables 715. The first processing system 105 may be configured to detect a first line of the user device 720 and a second line of the user device 720. For example, the first processing system 105 may be configured to detect a data line of the user device 720 (e.g., access to private user information) and a charge line of the user device 720 (e.g., access to electric storage). In some examples, the first processing system 105 may be configured to adjust, isolate, or otherwise block the data line between the user device 720 and the charging port 710 while the user device 720 is charging (e.g., while the charge cables 715 transmit electrical charge via the charge line to charge the user device 720). For example, the first processing system 105 may be configured to block the data line between the user device 720 and the charging port 710 such that the first processing system 105 does not have access to data of the user device (e.g., user identification data, account data, etc.) to maintain security of a user of the user device 720. By way of non-limiting example, the charge cables 715 may include a standard 2.0 Universal Serial Bus (USB) cable having a drain wire, two power conductor wires, and two data line wires. The two power conductor wires may be configured to transmit electricity and the two data line wires may be configured to transmit data between devices. The first processing system 105 may be configured to deactivate one or more of the data line wires such that only the power conductor wires can transmit power to the user device 720.

Referring now to FIG. 8, the first processing system 105 may be configured to expose (e.g., open, unlatch, etc.) a second compartment 805 including at least one charging port 810 in response to the first ATM 110 being in the second mode (e.g., calamity mode). It is important to the note that the first compartment 705 and the second compartment 805 are described separately for illustrative purposes only. In some examples, the first compartment 705 and the second compartment 805 may make up a unitary compartment. In some examples, the first compartment 705 and the second compartment 805 are separate from one another. As shown in FIG. 8, the second compartment 805 can include at least one charge cable 815 to facilitate coupling one or more components to the charging port 810. For example, the one or more charge cables 815 may be configured to couple to a portion of a battery 820, such as a vehicle battery, a solar panel, or a similar power generator. In some examples, the charge cables 815 may couple to a portion of a battery 820 to facilitate providing charge to the first ATM 110. For example, the first processing system 105 may detect that the first ATM 110 does not have enough power (e.g., loss of power, low power, disconnected from a power source, etc.). The first processing system 105 may be configured to expose the second compartment 805 such that the first ATM 110 can receive power from an external power source, such as the battery 820 through the charge cables 815. In some examples, the charge cables 815 may include one or more stretchable materials (e.g., latex, elastomers, etc.) such that the charge cables 815 can stretch to couple to the battery 820. In some embodiments, the second compartment 805 may include one or more additional or alternative power generating components including, but not limited to, hand cranks, pedals, fluid turbines, or solar panels to provide power to the first ATM 110.

Figure 9:
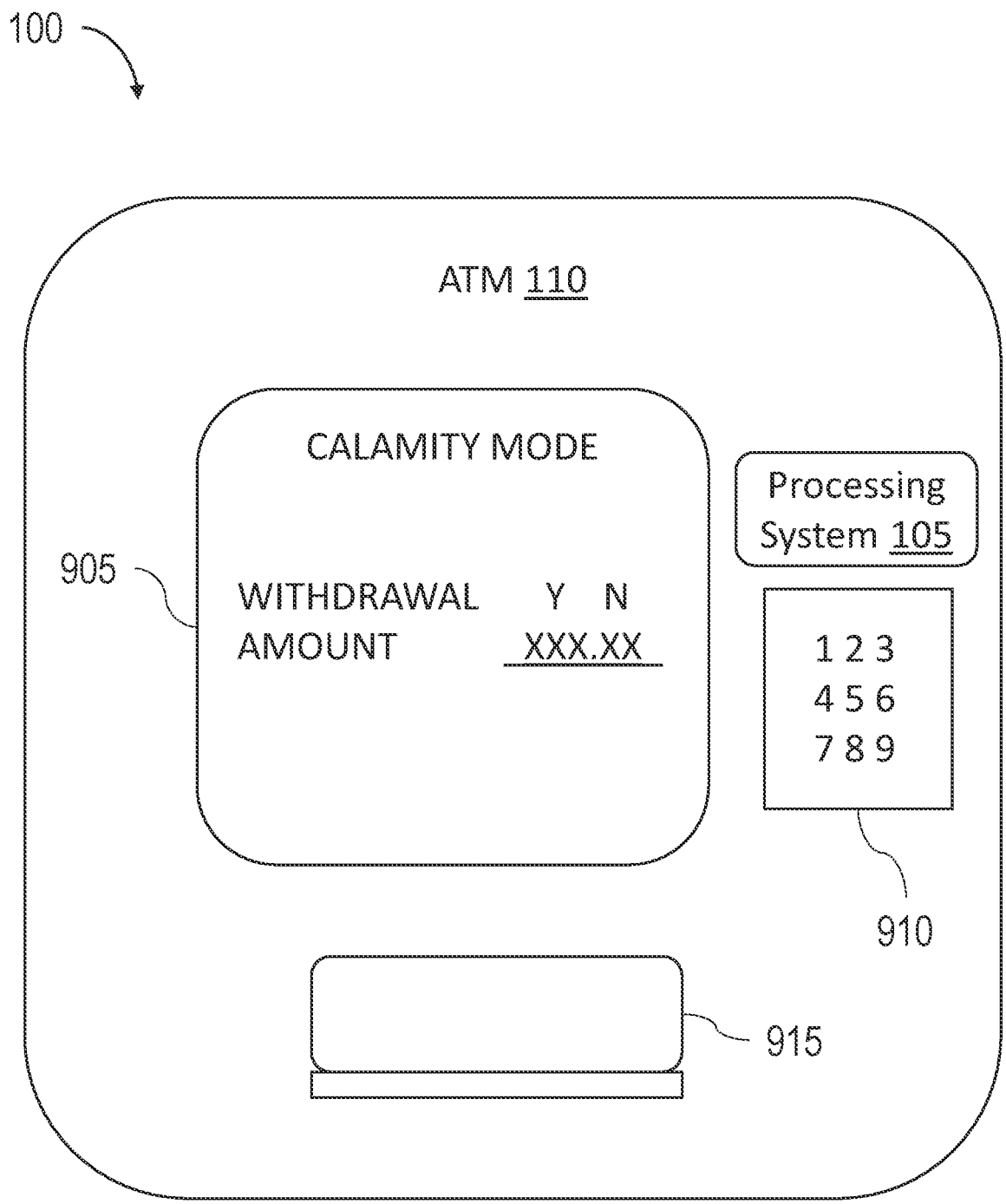
FIG. 9 shows an example of an ATM in a calamity mode, according to an illustrative embodiment.

Referring now to FIG. 9, an example of the first ATM 110 in the calamity mode is shown according to an example embodiment. As shown in FIG. 9, the first processing system 105 may be configured to receive at least one withdrawal request from a user. For example, the first processing system 105 may be configured to receive a withdrawal request from a user of the first ATM 110 when the first ATM 110 is in the second mode (e.g., the calamity mode). In some examples, the first processing system 105 may be configured to receive a user input to the first ATM 110 corresponding to the request to withdraw currency. For example, the first processing system 105 may be configured to receive an indication to withdraw currency through a manual input pad 910 of the first ATM 110, such as a number pad, keyboard, or the like. In some examples, the first processing system 105 may be configured to receive a request to withdraw currency from a source separate from the first ATM 110. For example, the first processing system 105 may be configured to receive a request to withdraw currency from a nearby user device including, but not limited to, a mobile device, a smart watch device, or a similar computing device communicably coupled to the first processing system 105 (e.g., through one or more cables or wireless access points described herein).

In some embodiments, the first processing system 105 may be configured to provide currency to a user (e.g., a customer of the financial institution of the first ATM 110 or a non-customer) based on the request. For example, the first processing system 105 may be configured to dispense currency from one or more currency outlets 915 of the first ATM 110. In some examples, the first processing system 105 may be configured to provide currency to a user without an ATM card (e.g., debit card) or other similar authentication. For example, when the first ATM 110 is in calamity mode, the first processing system 105 may be configured to dispense currency under a threshold limit amount without receiving authentication from an ATM card. By way of example, the first ATM 110 may include a withdrawal threshold limit of $100 without an ATM card or other similar authentication during a calamity. If a user requests to withdraw $99 from the first ATM 110 without an ATM card with a threshold limit of $100 in the calamity mode, the first processing system 105 may be configured to provide the user with $99, even without additional authentication. If a user requests to withdraw $101 from the first ATM 110 without an ATM card with a threshold limit of $100 in the calamity mode, the first processing system 105 may be configured to request additional authentication of the user. For example, the first processing system 105 may be configured to request a physical or virtual card, account number, or the like corresponding to an account of the user to complete the withdrawal request. The threshold limit described is for illustrative purposes only. In various examples, the threshold amount limit may be significantly less than or greater than $100. For example, the threshold limit may be about $1. The threshold limit may be about $10,000, according to another example. In some embodiments, the first processing system 105 may be configured to request additional authorization and/or identification information in response to receiving the withdrawal request. For example, in the calamity mode, the first processing system 105 may be configured to prompt a user to enter additional biometric data to the first ATM 110 in order to complete the withdrawal request.

In some embodiments, the first processing system 105 may be configured to provide currency through the first ATM 110 in response to receiving an identification of a user. For example, the first processing system 105 may be configured to provide currency through the first ATM 110 is response to a user inputting an identification card, such as a driver's license (e.g., if a user does not have access to an ATM card). In some examples, the first processing system 105 may be configured to store identification information of a user of the first ATM 110 in response to receiving an identification card. For example, the first processing system 105 may be configured to store identification information of a user (e.g., name, address, etc.) such that a provider of the ATM can identify or locate the user upon conclusion of the calamity (e.g., to settle the balance of the currency withdrawal). In some examples, the first processing system 105 may be configured to provide currency through the first ATM 110, even with reduced or eliminated withdrawal transaction fees. For example, the first processing system 105 may be configured to provide currency through the first ATM 110 in response to receiving a withdrawal request without receiving a transaction fee (e.g., transaction percentage fee). In some examples, the first processing system 105 may be configured to cause an adjacent ATM (e.g., such as the third ATM 320 described above in reference to FIG. 3) to provide currency to a user based on a withdrawal request to either the first ATM 110 or the third ATM 320.

In some embodiments, the first ATM 110 may include at least one indication that the first ATM 110 is in the second mode (e.g., the calamity mode). For example, the first processing system 105 may be configured to provide an indication through one or more displays of the first ATM 110 (shown as display 905 in FIG. 9). In some examples, the first processing system 105 may be configured to provide an indication that the first ATM 110 is in the calamity mode in a variety of audio and/or visual means including, but not limited to, lights, sounds, or the like. In some examples, the first processing system 105 may be configured to automatically restore default settings of the first ATM 110 in response to detecting the end of the calamity, as described above. Similarly, the second processing system 115 may be configured to automatically restore default settings of the second ATM 120 in response to detecting the end of the calamity.

Figure 10:
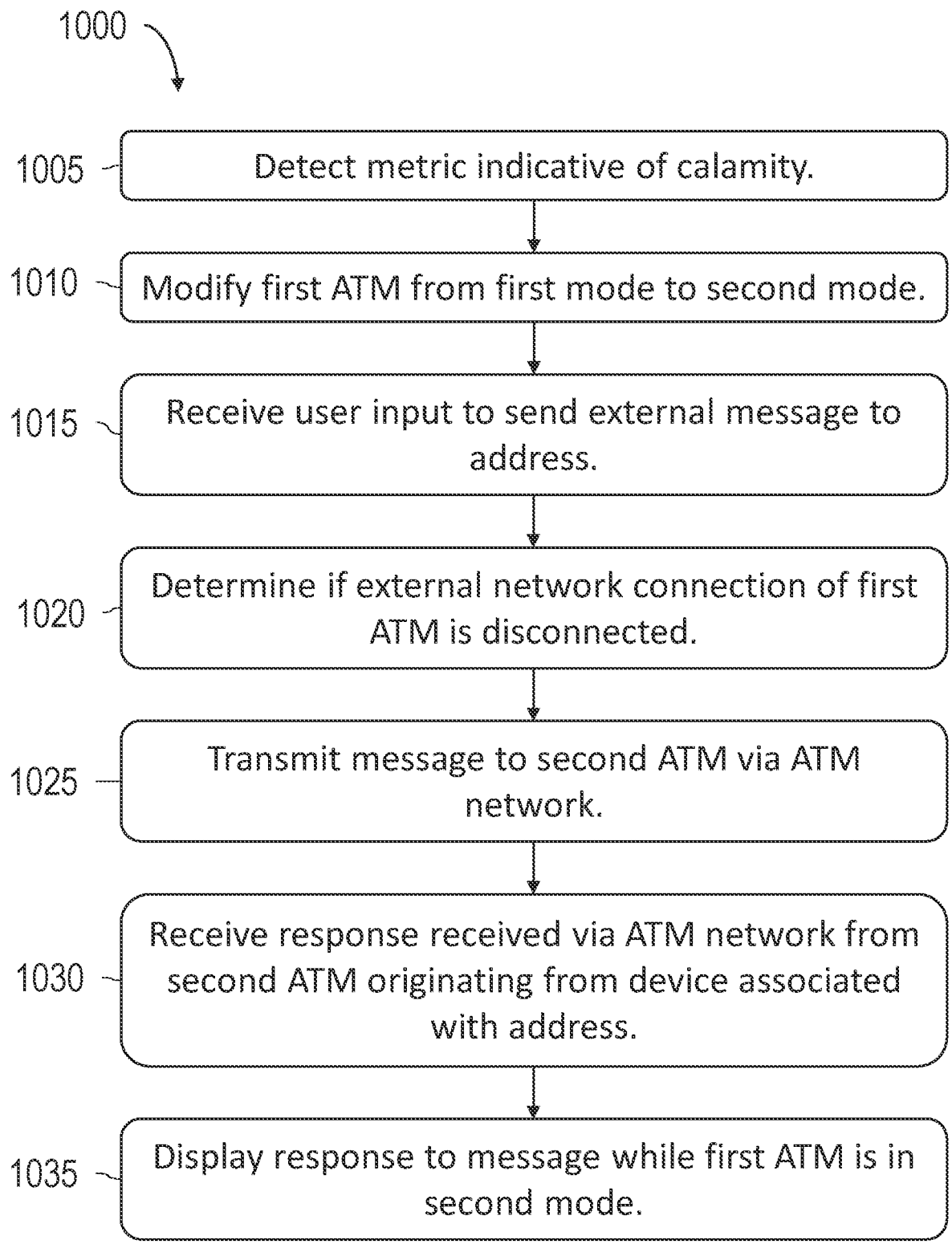
FIG. 10 shows a flow diagram of a method of communicating through a system, according to an illustrative embodiment.

Referring now to FIG. 10, depicted is a flowchart showing a method 1000 of communicating through the system 100, according to an illustrative embodiment. The steps of the method 1000 may be performed by one or more components described in reference to FIG. 1-FIG. 9.

As an overview, the first processing system 105 may detect a metric indicative of a calamity at step 1005. At step 1010, the first processing system 105 may modify a first ATM 110 from a first mode to a second mode in response to detecting the metric. At step 1015, the first processing system 105 may receive a user input to send a message to an address. At step 1020, the first processing system 105 may determine that an external network 125 connection of the first ATM 110 is disconnected. At step 1025, the first processing system 105 may transmit the message to a second ATM 120 through an ATM network 130. At step 1030, the first processing system 105 may receive a response from the second ATM 120 originating from a device associated with the address. At step 1035, the first processing system 105 may display the response to the message through the first ATM 110 while the first ATM 110 is in the second mode.

In greater detail, at step 1005, the first processing system 105 may detect a metric indicative of a calamity. As described above, the first processing system 105 may detect a metric indicative of a calamity from a plurality of sensors communicably and/or operably coupled to the first ATM 110. In some embodiments, the first processing system 105 may detect a metric indicative of a calamity from one or more inputs or signals from an external source, such as an authorized user, centralized remote command center, or another similar authorized external source, as described above in reference to FIG. 1.

At step 1010, the first processing system 105 may modify the first ATM 110 from a first mode to a second mode. For example, the first processing system 105 may modify one or more components of the first ATM 110 to switch the first ATM 110 from a normal operating mode to a calamity mode in response to detecting the metric indicative of a calamity. In some embodiments, the first processing system 105 may be configured to provide an indication, a notification, or the like to a user through the first ATM 110 to indicate that the first ATM 110 is in the calamity mode such as, but not limited to, an audio and/or visual signature, alarm, or the like.

At step 1015, the first processing system 105 may receive a user input to send a message to an address. As described above, the first processing system 105 may receive a user input through various means including, but not limited to, a manual input to a physical component of the first ATM 110 (e.g., such as a user input to a user interface 150 of the first ATM 110, user input to a keypad of the first ATM 110, etc.) and/or an input from another device communicably coupled to the first processing system 105, such as a mobile device, smart watch, head phones, or other similar devices. In some embodiments, the first processing system 105 may receive a user input to a third ATM 320 located nearby the first ATM 110 indicating to send a message to an address, as described above in reference to FIG. 3. In some embodiments, the address may correspond to an address of a corresponding user device to receive the message.

At step 1020, the first processing system 105 may determine whether the first ATM 110 is connected to an external network 125. In some embodiments, the first processing system 105 may determine that the first ATM 110 is disconnected from (e.g., not communicably coupled to, incapable of communicably coupling to, etc.) the external network 125. In some embodiments, the first processing system 105 may determine that the first ATM 110 is disconnected from the external network 125, but may detect that the second ATM 120 is connected to or is capable of connecting to (e.g., communicably coupling to) the external network 125. For example, as described above, the first processing system 105 may receive one or more signals from the second processing system 115 though an ATM network 130 indicating that the second processing system 115 is communicably coupled to the external network 125. In some instances, the first processing system 105 and the second processing system 115 may periodically transmit signals through the ATM network 130 at various time intervals (e.g., every second, every 10 second, every minute, etc.). In some instances, the first processing system 105 and the second processing system 115 may transmit signals through the ATM network 130 responsive to detecting a calamity. In some instances, the first processing system 105 and the second processing system 115 may periodically transmit signals through the ATM network 130 responsive to a query from an ATM of the ATM network 130 responsive to the first ATM 110 detecting the calamity. In some embodiments, the first processing system 105 may determine that the first ATM 110 is connected to (e.g., communicably coupled to) the external network 125.

At step 1025, the first processing system 105 may transmit the message to the second ATM 120. For example, responsive to the first processing system 105 determining that the first ATM 110 is not communicably coupled to the external network 125, the first processing system 105 may transmit the message to the second processing system 115 via the ATM network 130. In some embodiments, the first processing system 105 may transmit the message directly to the address. For example, responsive to the first processing system 105 determining that the first ATM 110 is communicably coupled to the external network 125, the first processing system 105 may transmit the message to the address via the external network 125.

At step 1030, the first processing system 105 may receive a response from the second ATM 120. For example, as described above, the first processing system 105 may receive a response originating from the address of the message (e.g., a device associated with the address) from the second ATM 120. In some embodiments, the first processing system 105 may receive the response originating from the address of the message via the ATM network 130. For example, as described above, the first processing system 105 may receive one or more unique identifiers (e.g., codes, cookies, data packet, device ID, etc.) associated with the message and/or the previous device (e.g., the second ATM 120) to establish a chain or ledger representing an exchange of communications between the first ATM 110 and the second ATM 120, such that the first ATM 110 can receive the response originating from the address. In some embodiments, the first processing system 105 may receive the response directly from the address (e.g., directly from the device associated with the address). For example, the first processing system 105 may receive a response through the external network 125.

At step 1035, the first processing system 105 may display the response to the message. In some embodiments, the first processing system 105 may display the response through one or more components of the first ATM 110, such as the user interface 150. In some embodiments, the first processing system 105 may display the response through one or more interfaces of devices communicably coupled to the first processing system 105, such as a nearby mobile device, smart watch, headphones, or the like. For example, the first processing system 105 may present the response to a user through various audio and/or visual means including, but not limited to, voice messaging, text messaging, or the like.

Figure 11:
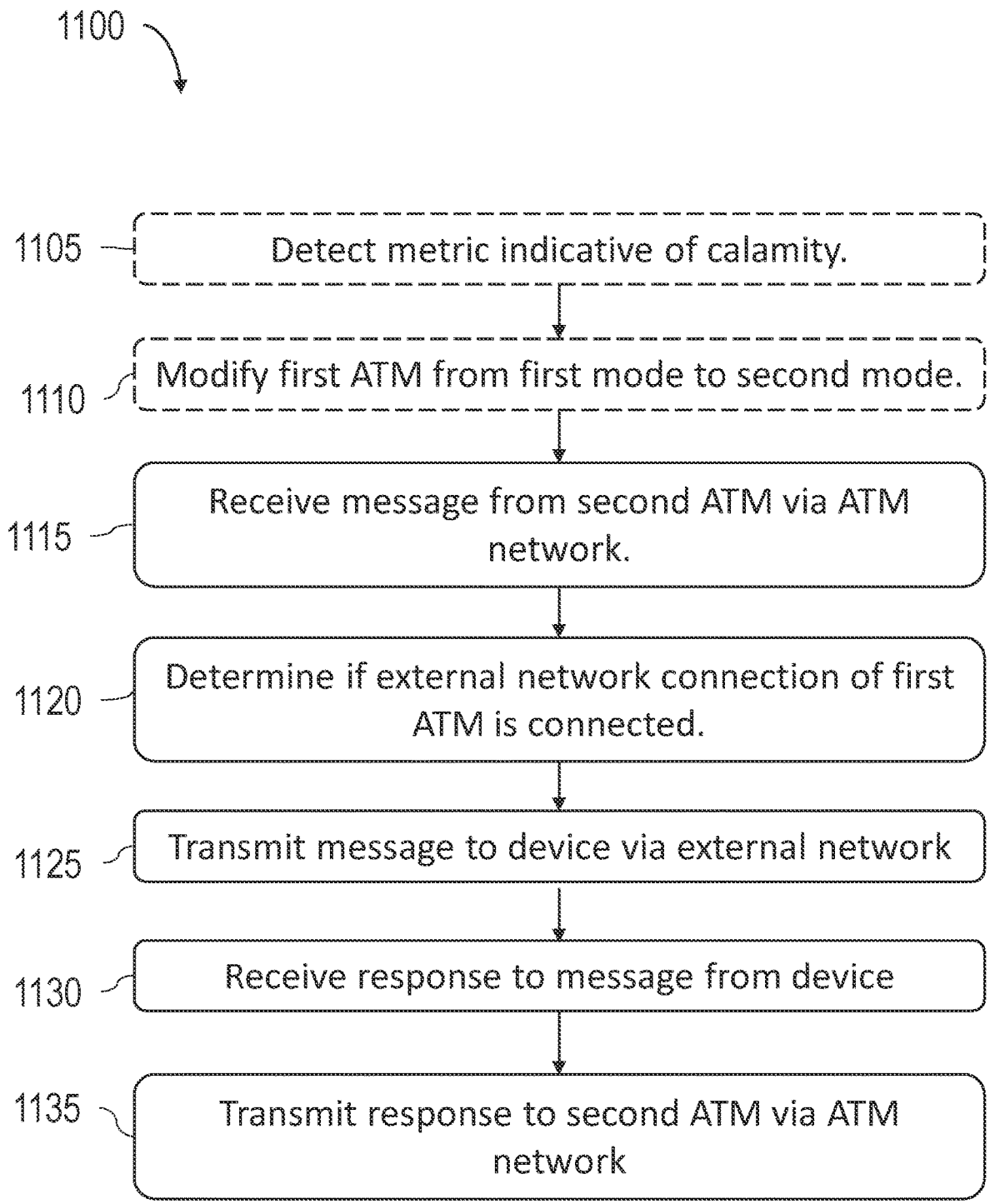
FIG. 11 shows a flow diagram of a method of communicating through a system, according to an illustrative embodiment.

Referring now to FIG. 11, depicted is a flowchart showing a method 1100 of communicating through the system 100, according to an illustrative embodiment. The steps of the method 1100 may be performed by one or more components described in reference to FIG. 1-FIG. 9.

As an overview, the second processing system 115 may optionally detect a metric indicative of a calamity at step 1105. At step 1110, the second processing system 115 may optionally modify the second ATM 120 from a first mode to a second mode. At step 1115, the second processing system 115 may receive a message from the first processing system 105 of the first ATM 110. At step 1120, the second processing system 115 may determine whether the second ATM 120 is connected to an external network 125. At step 1125, the second processing system 115 may transmit the message to a device. At step 1130, the second processing system 115 may receive a response to the message from the device. At step 1135, the second processing system 115 may transmit the response to the first processing system 105 of the first ATM 110.

In greater detail, at optional step 1105, the second processing system 115 may detect a metric indicative of a calamity. As described above, the second processing system 115 may detect a metric indicative of a calamity from a plurality of sensors communicably and/or operably coupled to the second ATM 120. In some embodiments, the second processing system 115 may detect a metric indicative of a calamity from one or more inputs or signals from an external source, such as an authorized user, centralized remote command center, or another similar authorized external source, as described above in reference to FIG. 1. In some instances, the second processing system 115 may skip step 1105 (e.g., not detect a metric) and may start the method at step 1115.

At optional step 1110, the second processing system 115 may modify the second ATM 120 from a first mode to a second mode. For example, the second processing system 115 may modify one or more components of the second ATM 120 to switch the second ATM 120 from a normal operating mode to a calamity mode in response to detecting the metric indicative of a calamity. In some embodiments, the second processing system 115 may be configured to provide an indication, a notification, or the like to a user through the second ATM 120 to indicate that the second ATM 120 is in the calamity mode such as, but not limited to, an audio and/or visual signature, alarm, or the like. In some instances, the second processing system 115 may skip step 1110 (e.g., not detect modify the second ATM 120) and may start the method at step 1115.

At step 1115, the second processing system 115 may receive a message from the first ATM 110. For example, as described above, the second processing system 115 may receive a message transmitted from the first processing system 105 of the first ATM 110. In some embodiments, the second processing system 115 may receive the message transmitted from the first processing system 105 via the ATM network 130.

At step 1120, the second processing system 115 may determine whether the second ATM 120 is connected to an external network 125. In some embodiments, the second processing system 115 may determine that the second ATM 120 is connected (e.g., communicably coupled to, capable of communicably coupling to, etc.) the external network 125. In some embodiments, the second processing system 115 may determine that the second ATM 120 is not connected to (e.g., not communicably coupled to, incapably of communicably coupling to, etc.) the external network 125. In some embodiments, the second processing system 115 may determine that the second ATM 120 is disconnected from the external network 125, but may detect that a third ATM 320 is connected to or is capable of connecting to (e.g., communicably coupling to) the external network 125. For example, as described above, the second processing system 115 may receive one or more signals from a third processing system 315 of the third ATM 320 though the ATM network 130 indicating that the third processing system 315 is communicably coupled to the external network 125.

At step 1125, the second processing system 115 may transmit the message to a device 135 associated with an address via the external network 125. For example, responsive to the second processing system 115 determining that the second ATM 120 is communicably coupled to the external network 125, the second processing system 115 may transmit the message to the device 135 associated with the address of the message via the external network 125. In some embodiments, the second processing system 115 may transmit the message to the third processing system 315 of the third ATM 320. For example, responsive to the second processing system 115 determining that the second ATM 120 is not communicably coupled to the external network 125, the second processing system 115 may transmit the message to the third processing system 315 of the third ATM 320 via the ATM network 130.

At step 1130, the second processing system 115 may receive a response to the message from the device 135 associated with the address. For example, as described above, the second processing system 115 may receive a response from the device 135 via the external network 125. In some embodiments, the second processing system 115 may receive the response originating from the device 135 associated with the address from an intermediate device 605, as described above in reference to FIG. 6. In some embodiments, the second processing system 115 may receive the response originating from the device 135 associated with the address from the third processing system 315 of the third ATM 320.

At step 1135, the second processing system 115 may transmit the response to the first processing system 105 of the first ATM 110 via the ATM network 130. For example, as described above, the second processing system 115 may transmit the response originating from the device 135 associated with the address to the first processing system 105 to cause the first processing system 105 to display the response to a user of the first ATM 110, such as through a display or other interface communicably coupled to the first ATM 110.

It should be understood that while many features of the system 100 described herein are described in reference to the first ATM 110 and the first processing system 105, the second ATM 120 and the third ATM 320, and each respective processing system, may include the same features of the first ATM 110 and the first processing system 105.

The embodiments described herein have been described with reference to drawings. The drawings illustrate certain details of specific embodiments that implement the systems, methods and programs described herein. However, describing the embodiments with drawings should not be construed as imposing on the disclosure any limitations that may be present in the drawings.

It should be understood that no claim element herein is to be construed under the provisions of 35 U.S.C. § 112(f), unless the element is expressly recited using the phrase "means for."

As used herein, the term "circuit" may include hardware structured to execute the functions described herein. In some embodiments, each respective "circuit" may include machine-readable media for configuring the hardware to execute the functions described herein. The circuit may be embodied as one or more circuitry components including, but not limited to, processing circuitry, network interfaces, peripheral devices, input devices, output devices, sensors, etc. In some embodiments, a circuit may take the form of one or more analog circuits, electronic circuits (e.g., integrated circuits (IC), discrete circuits, system on a chip (SOCs) circuits, etc.), telecommunication circuits, hybrid circuits, and any other type of "circuit." In this regard, the "circuit" may include any type of component for accomplishing or facilitating achievement of the operations described herein. For example, a circuit as described herein may include one or more transistors, logic gates (e.g., NAND, AND, NOR, OR, XOR, NOT, XNOR, etc.), resistors, multiplexers, registers, capacitors, inductors, diodes, wiring, and so on).

The "circuit" may also include one or more processors communicatively coupled to one or more memory or memory devices. In this regard, the one or more processors may execute instructions stored in the memory or may execute instructions otherwise accessible to the one or more processors. In some embodiments, the one or more processors may be embodied in various ways. The one or more processors may be constructed in a manner sufficient to perform at least the operations described herein. In some embodiments, the one or more processors may be shared by multiple circuits (e.g., circuit A and circuit B may comprise or otherwise share the same processor which, in some example embodiments, may execute instructions stored, or otherwise accessed, via different areas of memory). Alternatively or additionally, the one or more processors may be structured to perform or otherwise execute certain operations independent of one or more co-processors. In other example embodiments, two or more processors may be coupled via a bus to enable independent, parallel, pipelined, or multi-threaded instruction execution. Each processor may be implemented as one or more general-purpose processors, application specific integrated circuits (ASICs), field programmable gate arrays (FPGAs), digital signal processors (DSPs), or other suitable electronic data processing components structured to execute instructions provided by memory. The one or more processors may take the form of a single core processor, multi-core processor (e.g., a dual core processor, triple core processor, quad core processor, etc.), microprocessor, etc. In some embodiments, the one or more processors may be external to the apparatus, for example the one or more processors may be a remote processor (e.g., a cloud based processor). Alternatively or additionally, the one or more processors may be internal and/or local to the apparatus. In this regard, a given circuit or components thereof may be disposed locally (e.g., as part of a local server, a local computing system, etc.) or remotely (e.g., as part of a remote server such as a cloud based server). To that end, a "circuit" as described herein may include components that are distributed across one or more locations.

An exemplary system for implementing the overall system or portions of the embodiments might include a general purpose computing computers in the form of computers, including a processing unit, a system memory, and a system bus that couples various system components including the system memory to the processing unit. Each memory device may include non-transient volatile storage media, non-volatile storage media, non-transitory storage media (e.g., one or more volatile and/or non-volatile memories), etc. In some embodiments, the non-volatile media may take the form of ROM, flash memory (e.g., flash memory such as NAND, 3D NAND, NOR, 3D NOR, etc.), EEPROM, MRAM, magnetic storage, hard discs, optical discs, etc. In other embodiments, the volatile storage media may take the form of RAM, TRAM, ZRAM, etc. Combinations of the above are also included within the scope of machine-readable media. In this regard, machine-executable instructions comprise, for example, instructions and data which cause a general purpose computer, special purpose computer, or special purpose processing machines to perform a certain function or group of functions. Each respective memory device may be operable to maintain or otherwise store information relating to the operations performed by one or more associated circuits, including processor instructions and related data (e.g., database components, object code components, script components, etc.), in accordance with the example embodiments described herein.

It should also be noted that the term "input devices," as described herein, may include any type of input device including, but not limited to, a keyboard, a keypad, a mouse, joystick or other input devices performing a similar function. Comparatively, the term "output device," as described herein, may include any type of output device including, but not limited to, a computer monitor, printer, facsimile machine, or other output devices performing a similar function.

Any foregoing references to currency or funds are intended to include fiat currencies, non-fiat currencies (e.g., precious metals), and math-based currencies (often referred to as cryptocurrencies). Examples of math-based currencies include Bitcoin, Litecoin, Dogecoin, and the like.

It should be noted that although the diagrams herein may show a specific order and composition of method steps, it is understood that the order of these steps may differ from what is depicted. For example, two or more steps may be performed concurrently or with partial concurrence. Also, some method steps that are performed as discrete steps may be combined, steps being performed as a combined step may be separated into discrete steps, the sequence of certain processes may be reversed or otherwise varied, and the nature or number of discrete processes may be altered or varied. The order or sequence of any element or apparatus may be varied or substituted according to alternative embodiments. Accordingly, all such modifications are intended to be included within the scope of the present disclosure as defined in the appended claims. Such variations will depend on the machine-readable media and hardware systems chosen and on designer choice. It is understood that all such variations are within the scope of the disclosure. Likewise, software and web implementations of the present disclosure could be accomplished with standard programming techniques with rule based logic and other logic to accomplish the various database searching steps, correlation steps, comparison steps and decision steps.

The foregoing description of embodiments has been presented for purposes of illustration and description. It is not intended to be exhaustive or to limit the disclosure to the precise form disclosed, and modifications and variations are possible in light of the above teachings or may be acquired from this disclosure. The embodiments were chosen and described in order to explain the principals of the disclosure and its practical application to enable one skilled in the art to utilize the various embodiments and with various modifications as are suited to the particular use contemplated. Other substitutions, modifications, changes and omissions may be made in the design, operating conditions and arrangement of the embodiments without departing from the scope of the present disclosure as expressed in the appended claims.

What is claimed is:

1. A system, comprising:
a processing system of a first automated teller machine (ATM), the first ATM communicably coupled via an ATM network to a second ATM, and the first ATM having a connection with an external network separate from the ATM network, wherein the processing system is configured to:
receive, by the processing system while the first ATM is in an external communication mode, a user input to send a message to an address;
determine, by the processing system, a connection status of the first ATM to the external network; and
transmit, by the processing system, the message, via at least one of the ATM network to the second ATM or via the external network, for routing to the address, according to the connection status.

2. The system of claim 1, wherein the processing system transmits the message via the ATM network to the second ATM for routing to the address, responsive to the connection status indicating a disconnection to the external network.

3. The system of claim 1, wherein the processing system transmits the message via the external network for routing to the address, responsive to the connection status indicating an active connection to the external network.

4. The system of claim 1, wherein the processing system is further configured to:
receive a response to the message, the response received via the ATM network from the second ATM or via the external network, the response originating from a device associated with the address; and
display, on a user interface of the first ATM, the response to the message while the first ATM.

5. The system of claim 1, wherein the user input is caused by an input to at least one of a portion of the first ATM or an external client device communicably coupled to the first ATM.

6. The system of claim 1, wherein the processing system is configured to:
detect an event which is to trigger switching an operational mode of the first ATM, from a first mode to a second mode;
switch, in response to detection of the event, the operational mode to the second mode, to cause the first ATM to facilitate sending and receiving messages to devices outside of the ATM network, the second mode comprising the external communication mode.

7. The system of claim 6, wherein the processing system is configured to detect the event based on sensor data of the first ATM that satisfies a threshold criterion indicative of the event.

8. The system of claim 6, wherein the event is indicative of a calamity.

9. The system of claim 6, wherein the processing system is configured to:
expose an internal compartment of the first ATM, the internal compartment comprising a charging port, in response to switching the operational mode to the second mode.

10. The system of claim 9, wherein the charging port comprises a charge line and a data line, and wherein the processing system is further configured to:
detect a user device communicably coupled to the charging port; and
block the data line between the user device and the charging port while transmitting electrical energy via the charge line to charge the user device.

11. A method, comprising:
receiving, by a processing system of a first automated teller machine (ATM) while the first ATM is in an external communication mode, a user input to send a message to an address;
determining, by the processing system, a connection status of the first ATM to an external network;
transmitting, by the processing system, the message, via at least one of a second ATM on an ATM network shared with the first ATM, or via the external network, for routing to the address, according to the connection status.

12. The method of claim 11, wherein transmitting the message comprises transmitting, by the processing system, the message via the ATM network to the second ATM for routing to the address, responsive to the connection status indicating a disconnection to the external network.

13. The method of claim 11, wherein transmitting the message comprises transmitting, by the processing system, the message via the external network for routing to the address, responsive to the connection status indicating an active connection to the external network.

14. The method of claim 11, further comprising:
receiving, by the processing system, a response to the message, the response received via the ATM network from the second ATM or via the external network, the response originating from a device associated with the address; and
displaying, on a user interface of the first ATM, the response to the message while the first ATM.

15. The method of claim 11, wherein the user input is caused by an input to at least one of a portion of the first ATM or an external client device communicably coupled to the first ATM.

16. The method of claim 11, further comprising:
detecting, by the processing system, an event which is to trigger switching an operational mode of the first ATM, from a first mode to a second mode;
switching, by the processing system, in response to detection of the event, the operational mode to the second mode, to cause the first ATM to facilitate sending and receiving messages to devices outside of the ATM network, the second mode comprising the external communication mode.

17. The method of claim 16, wherein the event is detected based on sensor data of the first ATM that satisfies a threshold criterion indicative of the event.

18. The method of claim 16, further comprising:

exposing, by the processing system, an internal compartment of the first ATM, the internal compartment comprising a charging port, in response to switching the operational mode to the second mode.

19. The method of claim 18, wherein the charging port comprises a charge line and a data line, the method further comprising:

detecting, by the processing system, a user device communicably coupled to the charging port; and blocking, by the processing system, the data line between the user device and the charging port while transmitting electrical energy via the charge line to charge the user device.

20. A non-transitory computer readable medium storing instructions that, when executed by one or more processors of a first automated teller machine (ATM), cause the one or more processors to:

receive, while the first ATM is in an external communication mode, a user input to send a message to an address;

determine a connection status of the first ATM to an external network;

transmit the message, via at least one of a second ATM on an ATM network shared with the first ATM, or via the external network, for routing to the address, according to the connection status.

* * * * *